US012365169B2

(12) United States Patent
Netsu et al.

(10) Patent No.: US 12,365,169 B2
(45) Date of Patent: Jul. 22, 2025

(54) DECORATIVE SHEET AND DECORATIVE PLATE

(71) Applicant: Dai Nippon Printing Co., Ltd., Tokyo (JP)

(72) Inventors: Yoshiaki Netsu, Tokyo (JP); Keisuke Kazama, Tokyo (JP); Yuka Sakaguchi, Tokyo (JP); Yoshihiro Kobayashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/441,074

(22) PCT Filed: Mar. 19, 2020

(86) PCT No.: PCT/JP2020/012180
§ 371 (c)(1),
(2) Date: Sep. 20, 2021

(87) PCT Pub. No.: WO2020/196217
PCT Pub. Date: Oct. 1, 2020

(65) Prior Publication Data
US 2022/0184932 A1    Jun. 16, 2022

(30) Foreign Application Priority Data

Mar. 25, 2019  (JP) .................................. 2019-057257
Sep. 27, 2019  (JP) .................................. 2019-177196

(51) Int. Cl.
B32B 3/10       (2006.01)
B32B 7/12       (2006.01)
(Continued)

(52) U.S. Cl.
CPC ................ *B32B 27/08* (2013.01); *B32B 7/12* (2013.01); *B32B 9/02* (2013.01); *B32B 9/042* (2013.01);
(Continued)

(58) Field of Classification Search
None
See application file for complete search history.

(56) References Cited

U.S. PATENT DOCUMENTS 7,759,418 B2    7/2010    Murakami et al.
7,851,528 B2   12/2010    Kanno et al.
(Continued)

FOREIGN PATENT DOCUMENTS

CN    101180369 A    5/2008
CN    101400735 A    4/2009
(Continued)

OTHER PUBLICATIONS

Machine translation of JP-2004323692-A (Year: 2004).*
(Continued)

*Primary Examiner* — Christopher M Polley
(74) *Attorney, Agent, or Firm* — Troutman Pepper Locke LLP

(57) ABSTRACT

The present invention provides a decorative sheet with excellent flame retardance and high sharpness such that patterns are clearly visible and discoloration is suppressed. The present invention provides a decorative sheet characterized by comprising one or more thermoplastic resin layers selected from the group consisting of a transparent resin layer, a base material sheet, and a synthetic-resin backer layer, wherein (1) at least one of the thermoplastic resin layers contains a metal phosphinate-based flame retardant; and (2) the transparent resin layer and the base material sheet
(Continued)

contain at least one resin selected from the group consisting of polyolefin-based resins and polyester-based resins.

19 Claims, 6 Drawing Sheets

(51) Int. Cl.
| | |
|---|---|
| B32B 9/02 | (2006.01) |
| B32B 9/04 | (2006.01) |
| B32B 21/14 | (2006.01) |
| B32B 27/08 | (2006.01) |
| B32B 27/16 | (2006.01) |
| B32B 27/18 | (2006.01) |
| B32B 27/32 | (2006.01) |
| E04B 1/94 | (2006.01) |
| E04F 15/10 | (2006.01) |

(52) U.S. Cl.
CPC .............. *B32B 9/045* (2013.01); *B32B 21/14* (2013.01); *B32B 27/16* (2013.01); *B32B 27/18* (2013.01); *B32B 27/32* (2013.01); *E04B 1/942* (2013.01); *E04F 15/102* (2013.01); *E04F 15/107* (2013.01); *B32B 2255/10* (2013.01); *B32B 2255/26* (2013.01); *B32B 2264/104* (2013.01); *B32B 2307/3065* (2013.01); *B32B 2307/4023* (2013.01); *B32B 2307/41* (2013.01); *B32B 2307/412* (2013.01); *B32B 2307/732* (2013.01); *B32B 2419/04* (2013.01); *B32B 2451/00* (2013.01)

(56) References Cited

U.S. PATENT DOCUMENTS

| | | | |
|---|---|---|---|
| 7,968,629 B2 | 6/2011 | Tsunoda et al. | |
| 8,575,246 B2 | 11/2013 | Ishii et al. | |
| 10,987,912 B2 | 4/2021 | Sekino et al. | |
| 2004/0176506 A1 | 9/2004 | Sicken et al. | |
| 2007/0141328 A1* | 6/2007 | Kamiyama | ............. B32B 27/40 427/407.1 |
| 2008/0051495 A1* | 2/2008 | Murakami | ........... C08K 5/5399 524/508 |
| 2009/0105382 A1 | 4/2009 | Kanno et al. | |
| 2009/0312468 A1 | 12/2009 | Tsunoda et al. | |
| 2011/0275743 A1 | 11/2011 | Ishii et al. | |
| 2012/0205136 A1 | 8/2012 | Moriuchi et al. | |
| 2015/0183991 A1 | 7/2015 | Yamamoto et al. | |
| 2019/0202192 A1 | 7/2019 | Sekino et al. | |

FOREIGN PATENT DOCUMENTS

| | | | |
|---|---|---|---|
| CN | 101717554 A | | 6/2010 |
| CN | 101945946 A | | 1/2011 |
| CN | 102307947 A | | 1/2012 |
| CN | 102575106 A | | 7/2012 |
| CN | 102782044 A | | 11/2012 |
| CN | 104650580 A | | 5/2015 |
| CN | 108912435 A | | 11/2018 |
| EP | 3098071 A1 | | 11/2016 |
| EP | 3437859 A1 | | 2/2019 |
| JP | 2004323692 A | * | 11/2004 |
| JP | 2007-056150 A | | 3/2007 |
| JP | 2007-100045 A | | 4/2007 |
| JP | 2012224091 A | * | 11/2012 |
| JP | 2014-088582 A | | 5/2014 |
| JP | 2015-182379 A | | 10/2015 |
| WO | 2006-043460 A1 | | 4/2006 |
| WO | 2018/047361 A1 | | 3/2018 |

OTHER PUBLICATIONS

Machine translation of JP-2012224091-A (Year: 2012).*
Office Action dated Dec. 5, 2022, issued for the corresponding Chinese patent application No. 202080023956.7 and a partial English translation thereof.
BASF Schweiz Ag, "Flamestab NOR 116", TI/EVE 1033e, Sep. 1, 2015, pp. 1-2. (cited in the Nov. 11, 2022 Search Report issued for EP20777494.4).
Supplementary European Search Report dated Nov. 11, 2022 for the corresponding EP patent application No. 20777494.4.
Shi Xinying et al., "Application and research progress in hypophosphite in phosphorus flame retardant," Inorganic Chemicals Industry, 2017, vol. 49, No. 9, pp. 1-4 and English abstract thereof. (cited in the Aug. 9, 2023 OA for CN202080023956.7).
Office Action dated Aug. 9, 2023, issued for the corresponding CN patent application No. 202080023956.7 and English partial translation thereof.
Office Action dated Feb. 6, 2024, issued for the corresponding Japanese patent application No. 2021-509286 and English translation thereof.

* cited by examiner

DECORATIVE SHEET AND DECORATIVE PLATE

CROSS REFERENCE TO RELATED APPLICATIONS

This application is related to co-pending application: "DECORATIVE SHEET AND DECORATIVE LAMINATE" filed even date herewith in the names of Yoshiaki Netsu, Keisuke Kazama, Yuka Sakaguchi and Yoshihiro Kobayashi as a national phase entry of PCT/JP2020/012183, which application is assigned to the assignee of the present application and is incorporated by reference herein.

TECHNICAL FIELD

The present invention relates to a decorative sheet and a decorative plate.

BACKGROUND ART

Conventionally, a decorative sheet is laminated on the surface of various articles in order to impart designability. For example, a decorative sheet is laminated on a base material and the resulting plate is used as a decorative plate for use on the floor surface of a building.

Since such a decorative plate is laminated on the surface of a building, the decorative plate is sometimes required to satisfy the requirements for acquiring non-combustion certification, which indicates resistance to burning in case of fire. The requirements for acquiring non-combustion certification refer to predetermined requirements in regard to the total heat release, maximum heat release rate, and generation of cracks and holes in a heat release test in accordance with ISO5660-1 as defined in Article 2(9) of the Building Standards Act of Japan.

As a decorative sheet for use in a decorative plate that meets the above requirements, for example, Patent Literature (PTL) 1 proposes a decorative sheet in which a base material sheet, a transparent resin layer, and a surface-protecting layer are laminated in this order; the thickness of each layer is within a specific range; and the decorative sheet contains a flame retardant.

The above decorative sheet has excellent flame retardance. However, whether the decorative sheet is resistant to fire spread has not been fully investigated, although it is important for a decorative sheet on a base material constructed on a horizontal surface to have properties of being resistant to fire spread in case of fire in order to secure the time for evacuation. Accordingly, for flame retardance, the property of reducing the heat release amount and the heat release rate in the heat release test in accordance with ISO 5660-1, or the property of suppressing the expansion of the burning area on the decorative sheet in case of fire and being resistant to fire spread, is important.

Flame retardants are useful in imparting flame retardance to decorative sheets. Examples of such flame retardants include halogen-based flame retardants, antimony-based flame retardants, metal hydroxide-based flame retardants, phosphoric-acid-ester-based flame retardants, and the like. However, halogenated flame retardants and antimony-based flame retardants have a problem in that they are undesirable from an environmental perspective.

When metal hydroxide-based flame retardants are used as flame retardants, they need to be added in large amounts. Phosphoric-acid-ester-based flame retardants form burning char during combustion, and suppress burning. When such phosphoric-acid-ester-based flame retardants are used, they must be added in large amounts in order to form burning char and obtain flame retardant effects. Therefore, when such a flame retardant is used, the transparency of the layer containing the flame retardant is impaired and coloring may also occur, thus resulting in a decorative sheet with reduced sharpness in the pattern of the decorative sheet.

Accordingly, there is a demand for the development of a decorative sheet with excellent flame retardance and high sharpness such that patterns are clearly visible and discoloration is suppressed.

CITATION LIST

Patent Literature

PTL 1: JP2015-182379A

SUMMARY OF INVENTION

Technical Problem

An object of the present invention is to provide a decorative sheet with excellent flame retardance and high sharpness such that patterns are clearly visible and discoloration is suppressed.

Solution to Problem

As a result of extensive research, the present inventors found that the above object can be achieved by a decorative sheet that comprises one or more thermoplastic resin layers selected from the group consisting of a transparent resin layer, a base material sheet, and a synthetic-resin backer layer, wherein at least one of the thermoplastic resin layers contains a metal phosphinate-based flame retardant, and the transparent resin and the base material sheet contain at least one resin selected from the group consisting of polyolefin-based resins and polyester-based resins. The present inventors thus accomplished the present invention.

More specifically, the present invention provides the following decorative sheets and decorative plates.

1. A decorative sheet comprising one or more thermoplastic resin layers selected from the group consisting of a transparent resin layer, a base material sheet, and a synthetic-resin backer layer, wherein
   (1) at least one of the thermoplastic resin layers contains a metal phosphinate-based flame retardant; and
   (2) the transparent resin layer and the base material sheet contain at least one resin selected from the group consisting of polyolefin-based resins and polyester-based resins.
2. The decorative sheet according to Item 1, wherein only the uppermost thermoplastic resin layer of the thermoplastic resin layers contains a metal phosphinate-based flame retardant; and the content of the metal phosphinate-based flame retardant is 3 mass % or more, based on the total mass of the thermoplastic resin layers being defined as 100 mass %.
3. The decorative sheet according to Item 1, wherein only the lowermost thermoplastic resin layer of the thermoplastic resin layers contains the metal phosphinate-based flame retardant, and the content of the metal phosphinate-based flame retardant is 14 mass % or more, based on the total mass of the thermoplastic resin layers being defined as 100 mass %.

4. The decorative sheet according to Item 1, wherein at least one of the thermoplastic resin layers contains a NOR-type hindered amine compound.
5. The decorative sheet according to Item 1, wherein at least one of the thermoplastic resin layers contains the metal phosphinate-based flame retardant and a filler.
6. The decorative sheet according to Item 5, wherein the filler is an inorganic filler having a polar group on the surface.
7. The decorative sheet according to any one of Items 1 to 6, comprising at least a picture pattern layer and the transparent resin layer formed on the base material sheet in this order.
8. The decorative sheet according to any one of Items 1 to 6, comprising a surface-protecting layer on the outermost surface.
9. The decorative sheet according to any one of Items 1 to 6, comprising at least a picture pattern layer, the transparent resin layer, and a surface-protecting layer formed on the base material sheet in this order.
10. The decorative sheet according to Item 8 or 9, wherein the surface-protecting layer is an ionizing radiation-curable resin layer.
11. The decorative sheet according to any one of Items 8 to 10, wherein the surface-protecting layer comprises the metal phosphinate-based flame retardant.
12. The decorative sheet according to Item 7 or 9, having an embossed shape on the transparent resin layer side.
13. A decorative plate comprising the decorative sheet of any one of Items 1 to 12 formed on a base material.

Advantageous Effects of Invention

The decorative sheet of the present invention has excellent flame retardance, so that fire does not easily spread. The decorative sheet also has high sharpness, so that patterns are clearly visible and discoloration is suppressed. The decorative plate of the present invention, which comprises this decorative sheet on a base material, is highly flame-retardant and can also have high sharpness.

DESCRIPTION OF EMBODIMENTS

Figure 1:
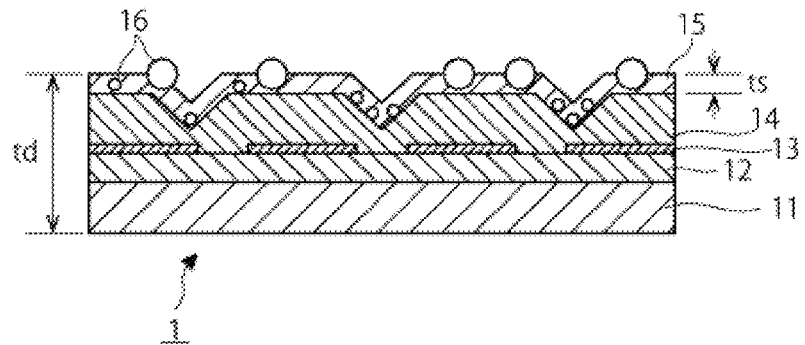
FIG. 1 is a schematic diagram illustrating an example of the layer structure of the decorative sheet according to the present invention.

The decorative sheet and the decorative plate of the present invention are described in detail below. In the decorative sheet of the present invention, the surface opposite to the side of the decorative sheet to be laminated on a base is the so-called "front surface," which is the visible surface when constructed on a floor or the like. Therefore, in the present specification, the direction of the surface of the decorative sheet opposite to the side to be laminated on the base is referred to as "above"; and the opposite direction, that is, the direction of the surface to be laminated on the base, is referred to as the "back" or "below." Similarly, in the present specification, the direction of the surface of the decorative plate on the decorative sheet side is referred to as "above"; and the opposite direction, that is, the direction of the surface on the base material side, is referred to as the "back" or "below."

1. Decorative Sheet

The decorative sheet according to the present invention is characterized in that: the decorative sheet comprises one or more thermoplastic resin layers selected from the group consisting of a transparent resin layer, a base material sheet, and a synthetic-resin backer layer, wherein
(1) at least one of the thermoplastic resin layers contains a metal phosphinate-based flame retardant; and
(2) the transparent resin layer and the base material sheet contain at least one resin selected from the group consisting of polyolefin-based resins and polyester-based resins.
Based on a combination of the following features (1) and (2):
(1) at least one of the thermoplastic resin layers contains a metal phosphinate-based flame retardant; and
(2) the transparent resin layer and the base material sheet contain at least one resin selected from the group consisting of polyolefin-based resins and polyester-based resins, the decorative sheet of the present invention, which is characterized as above, has the property of reducing the heat release amount and the heat release rate in a heat release test in accordance with ISO 5660-1; or the property of suppressing the expansion of the burning area on the decorative sheet in case of fire and preventing fire from easily spreading. Specifically, the decorative sheet of the present invention is flame-retardant, and also has high sharpness such that patterns are clearly visible and discoloration is suppressed.

Further, when the flame retardant is incorporated into the transparent resin layer, its low content suppresses reduction in transparency. When the flame retardant is incorporated into the base material sheet, its low content suppresses printing omission, thus providing a decorative sheet with excellent designability, such as a picture pattern shown on the decorative sheet. Further, the lamination of the decorative sheet on the base material can provide a decorative plate with excellent flame retardance and thus can achieve good results in the heat release test in accordance with ISO 5660-1, or the horizontal burning test.

Figure 2:
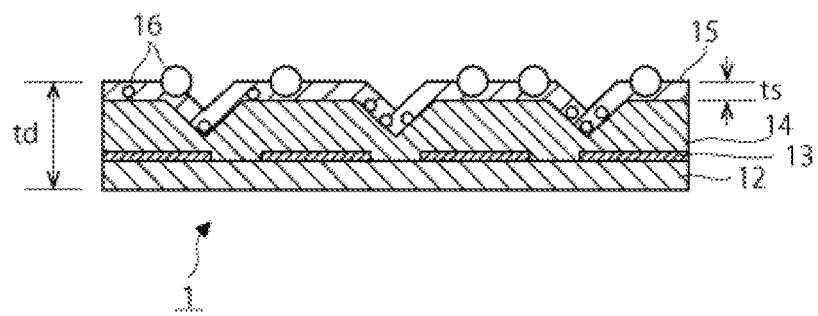
FIG. 2 is a schematic diagram illustrating an example of the layer structure of the decorative sheet according to the present invention.
Figure 3:
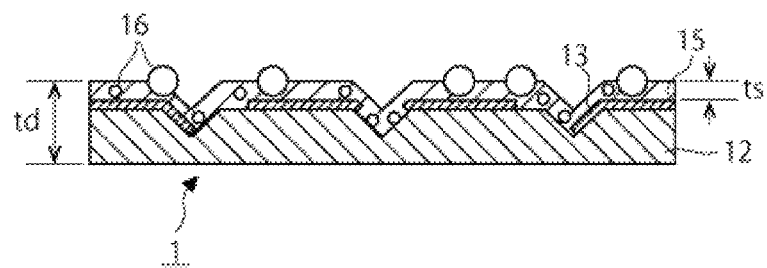
FIG. 3 is a schematic diagram illustrating an example of the layer structure of the decorative sheet according to the present invention.
Figure 4:
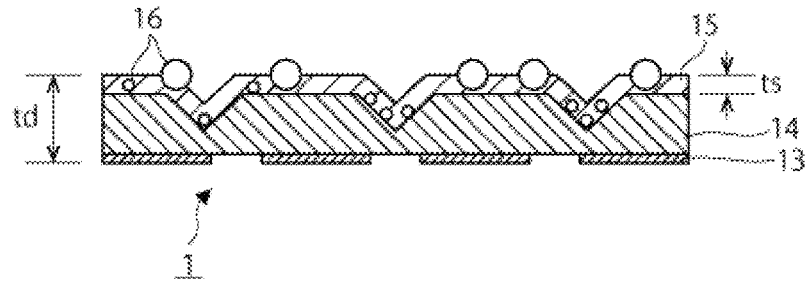
FIG. 4 is a schematic diagram illustrating an example of the layer structure of the decorative sheet according to the present invention.

The layer structure of the decorative sheet of the present invention is not particularly limited as long as the decorative sheet of the present invention comprises one or more thermoplastic resin layers selected from the group consisting of a transparent resin layer, a base material sheet, and a synthetic-resin backer layer and satisfies the above requirements (1) and (2). One example of the layer structure of the decorative sheet of the present invention is a layer structure comprising at least a picture pattern layer and a transparent resin layer formed in this order on a base material sheet. As shown in FIG. 1, an example of the layer structure is a layer structure comprising a synthetic-resin backer layer 11, a base material sheet 12, a picture pattern layer 13 (a solid ink layer and/or a pattern ink layer), an adhesive layer (not shown), a transparent resin layer 14, a primer layer (not shown), and a surface-protecting layer 15 in this order (a decorative sheet with a doubling specification comprising a synthetic-resin backer layer). As shown in FIG. 2, the decorative sheet of the present invention may have a layer structure comprising a base material sheet 12, a picture pattern layer 13 (a solid ink layer and/or a pattern ink layer), an adhesive layer (not shown), a transparent resin layer 14, and a surface-protecting layer 15 in this order (a decorative sheet with a doubling specification), which does not include a synthetic-resin backer layer. As shown in FIG. 3, the decorative sheet of the present invention may have a layer structure comprising a base material sheet 12, a picture pattern layer 13 (a solid ink layer and/or a pattern ink layer), a primer layer (not shown), and a surface-protecting layer 15 in this order (a decorative sheet with a single layer specification). Further, as shown in FIG. 4, the decorative sheet may have a layer structure comprising a picture pattern layer 13 (a solid ink layer and/or a pattern ink layer), an adhesive layer (not shown), a transparent resin layer 14, a primer layer (not shown), and a surface-protecting layer 15 in this order (a decorative sheet with a back printing specification). A decorative sheet having such a layer structure is used as a representative example, and is described in detail below.

Metal phosphinate-Based Flame Retardant

The decorative sheet according to the present invention comprises one or more thermoplastic resin layers selected from the group consisting of a transparent resin layer, a base material sheet, and a synthetic-resin backer layer, wherein at least one of the thermoplastic resin layers contains a metal phosphinate-based flame retardant.

Examples of metal phosphinate-based flame retardants include metal phosphinates and/or dimetal phosphinates (hereinafter also referred to as "metal phosphinates").

Examples of metal phosphinates include compounds represented by the following formula (1):

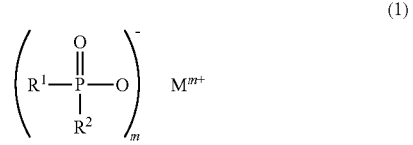

(1)

Examples of dimetal phosphinates include compounds represented by the following formula (2):

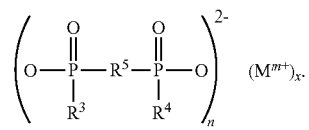

(2)

In formulas (1) and (2), $R^1$, $R^2$, $R^3$, and $R^4$ are each independently selected from the group consisting of $C_1$-$C_6$ alkyl groups, $C_6$-$C_{12}$ aryl groups, and $C_7$-$C_{20}$ arylalkyl groups. $R^5$ is selected from the group consisting of $C_1$-$C_{10}$ alkylene groups, $C_6$-$C_{10}$ arylene groups, $C_7$-$C_{20}$ alkylarylene groups, and $C_7$-$C_{20}$ arylalkylene groups. M is at least one metal selected from the group consisting of calcium (ion), magnesium (ion), aluminum (ion), and zinc (ion); m is 2 or 3; n is 1 or 3; and x is 1 or 2.

Examples of the alkyl groups include linear or branched saturated aliphatic groups. Examples of the aryl groups include $C_6$-$C_{20}$ aromatic groups that are unsubstituted or substituted with various substituents. Specific examples include phenyl, benzyl, o-toluoyl, 2,3-xylyl, and the like.

The metal phosphinates can be produced in an aqueous solution using phosphinic acid and a metal component, such as metal carbonates, metal hydroxides, or metal oxides, as described in European Patent Publication No. 699708 and JPH8-73720A. These are essentially monomeric compounds; however, in some environments, polymeric metal phosphinates with a degree of condensation of 1 to 3 are also included depending on the reaction conditions.

The phosphinic acids and diphosphinic acids that form the metal phosphinates are not limited. Examples include dimethylphosphinic acid, ethylmethylphosphinic acid, diethylphosphinic acid, methyl-n-propylphosphinic acid, methanedi (methylphosphinic acid), benzene-1,4-di (methylphosphinic acid), methylphenylphosphinic acid, diphenylphosphinic acid, and the like.

Examples of metal components that form metal phosphinates include, but are not limited to, calcium ions, magnesium ions, aluminum ions, zinc ions, and the like.

Examples of the metal phosphinates include, but are not limited to, calcium dimethylphosphinate, magnesium dimethylphosphinate, aluminum phosphinate, aluminum dimethylphosphinate, zinc phosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylenebis(methylphosphinate), magnesium methylenebis(methylphosphinate), aluminum methylenebis(methylphosphinate), zinc methylenebis(methylphosphinate), calcium phenylene-1,4-bis(methylphosphinate), magnesium phenylene-1,4-bis(methylphosphinate), aluminum phenylene-1,4-bis(methylphosphinate), zinc phenylene-1,4-bis(methylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. Among these, aluminum phosphinate and zinc phosphinate are preferred because they are more flame-retardant.

The metal phosphinate-based flame retardants may be used singly, or in a mixture of two or more.

In the decorative sheet comprising one or more thermoplastic resin layers selected from the group consisting of a transparent resin layer, a base material sheet, and a synthetic-resin backer layer, a metal phosphinate-based flame retardant may be present in at least one of thermoplastic resin layers. For example, when the decorative sheet comprises a transparent resin layer and a base material sheet, the decorative sheet may have a structure in which the transparent resin layer and the base material sheet both contain a metal phosphinate-based flame retardant; a structure in which the transparent resin layer contains a metal phosphinate-based flame retardant, and the base material sheet does not contain a metal phosphinate-based flame retardant; a structure in which the base material sheet contains a metal phosphinate-based flame retardant, and the transparent resin layer does not contain a metal phosphinate-based flame retardant; and the like.

When the decorative sheet has a structure in which only the uppermost thermoplastic resin layer of the thermoplastic resin layers contains a metal phosphinate-based flame retardant, the content of the metal phosphinate-based flame retardant is preferably 3 mass % or more, and more preferably 4.4 mass % or more, based on the total mass of the thermoplastic resin layers being defined as 100 mass %. When the decorative sheet has the above structure, the content of the metal phosphinate-based flame retardant is preferably 20 mass % or less, and more preferably 15 mass % or less, based on the total mass of the thermoplastic resin layers being defined as 100 mass %. Since the lower limit of the metal phosphinate-based flame retardant content is within the range described above, the decorative sheet has further improved flame retardance. On the other hand, since the upper limit of the metal phosphinate-based flame retardant content is within the range described above, the decorative sheet has further enhanced sharpness.

When the decorative sheet has a structure in which only the lowermost thermoplastic resin layer of the thermoplastic resin layers contains a metal phosphinate-based flame retardant, the content of the metal phosphinate-based flame retardant is preferably 14.0 mass % or more, and more preferably 14.4 mass % or more, based on the total mass of the thermoplastic resin layers being defined as 100 mass %. When the decorative sheet has the above structure, the content of the metal phosphinate-based flame retardant is preferably 30 mass % or less, and more preferably 20 mass % or less, based on the total mass of the thermoplastic resin layers being defined as 100 mass %. Since the lower limit of the metal phosphinate-based flame retardant content is within the range described above, the decorative sheet has further enhanced flame retardance. Since the upper limit of the metal phosphinate-based flame retardant is within the range described above, the lowermost layer has further excellent strength.

NOR-Type Hindered Amine Compound

The decorative sheet of the present invention comprises one or more thermoplastic resin layers selected from the group consisting of a transparent resin layer, a base material sheet, and a synthetic-resin backer layer, and at least one of the thermoplastic resin layers preferably contains a NOR-type hindered amine compound. The NOR-type hindered amine compound can trap radicals generated from organic materials during combustion, and thereby make it difficult for combustion to continue. Therefore, incorporating a hindered amine compound into at least one of the thermoplastic resin layers in the decorative sheet can further reduce the heat release amount in a heat release test in accordance with ISO 5660-1. From the viewpoint of further enhancing the above effects, the decorative sheet of the present invention more preferably has a structure in which at least one of the thermoplastic resin layers contains a metal phosphinate-based flame retardant and a NOR-type hindered amine compound; that is, a metal phosphinate-based flame retardant and a NOR-type hindered amine compound are more preferably both present in the same layer.

Examples of the NOR-type hindered amine compound include the compound represented by the following formula (3):

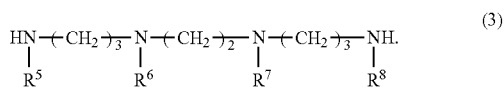

In formula (3), $R^5$ to $R^9$ each independently represent a hydrogen atom or an organic group represented by the following formula (4). At least one of $R^5$ to $R^9$ is an organic group represented by the following formula (4):

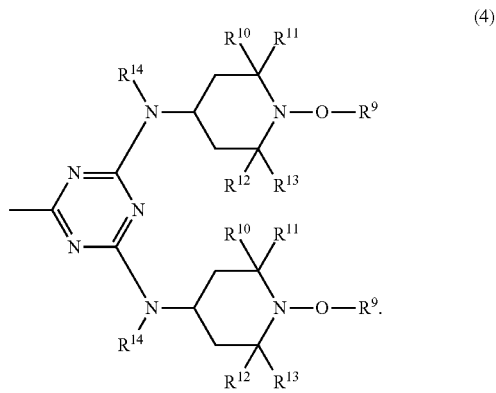

In formula (4), $R^9$ represents a $C_1$-$C_{17}$ alkyl group, a $C_5$-$C_{10}$ cycloalkyl group, phenyl or a $C_7$-$C_{15}$ phenylalkyl group; and $R^{10}$, $R^{12}$, and Rn each independently represent a $C_1$-$C_4$ alkyl group. $R^{14}$ represents a hydrogen atom or a $C_1$-$C_{12}$ linear or branched alkyl group.

The $C_1$-$C_{17}$ alkyl group represented by $R^9$ is preferably methyl or octyl. The $C_5$-$C_{10}$ cycloalkyl group is preferably cyclohexyl. The phenyl or $C_7$-$C_{15}$ phenylalkyl group is preferably phenyl. The $C_1$-$C_4$ alkyl group represented by $R^{10}$ to $R^{13}$ is preferably methyl. The $C_1$-$C_{12}$ linear or branched alkyl group represented by $R^{14}$ is preferably n-butyl.

In formula (3), $R^5$, $R^6$, and $R^7$ are preferably an organic group represented by formula (4); or $R^5$, $R^6$, and $R^8$ are preferably an organic group represented by formula (4).

Specific examples of NOR-type hindered amine compounds include N,N',N"-tris{2,4-bis[(1-hydrocarbioxy-2,2,6,6-tetramethylpiperidin-4-yl)alkylamino]-s-triazin-6-yl}-3,3'-ethylenediiminodipropylamine, N,N',N"-tris{2,4-bis[(1-hydrocarbioxy-2,2,6,6-tetramethylpiperidin-4-yl)alkylamin]-s-triazin-6-yl}-3,3'-ethylenediiminodipropylamine, and crosslinked derivatives thereof, bis(1-octyloxy-2,2,6,6-tetramethylpiperidin-4-yl) sebacate, bis(1-octyloxy-2,2,6,6-tetramethylpiperidin-4-yl) adipate, bis(1-cyclohexyloxy-2,2,6,6-tetramethylpiperidin-4-yl)adipate, bis(1-cyclohexyloxy-2,2,6,6- tetramethylpiperidin-4-yl)sebacate, 1-cyclohexyloxy-2,2,6,6-tetramethylpiperidin-4-yl-octadecanoate, and the like.

Such NOR-type hindered amine compounds can be used singly, or in a mixture of two or more.

In the thermoplastic resin layers containing the NOR-type hindered amine compound, the content of the NOR-type hindered amine compound is preferably 0.2 to 5 mass %, and more preferably 0.5 to 3 mass %, based on the layers containing the NOR-type hindered amine compound being defined as 100 mass %.

Base Material Sheet

In the decorative sheet of the present invention, the base material sheet is one of the thermoplastic resin layers that may contain a metal phosphinate-based flame retardant, as described above.

When the base material sheet contains a metal phosphinate-based flame retardant, the content of the metal phosphinate-based flame retardant in the base material sheet is preferably 5 parts by mass or more, and more preferably 7.5 parts by mass or more, based on the amount of at least one resin selected from the group consisting of polyolefin-based resins and polyester-based resins in the base material sheet being defined as 100 parts by mass. The content of the metal phosphinate-based flame retardant in the base material sheet is preferably 30 parts by mass or less, and more preferably 20 parts by mass or less. Since the lower limit of the content of metal phosphinate-based flame retardants in the base material sheet is within the range described above, the decorative sheet has further enhanced flame retardance. Since the upper limit of the content of the metal phosphinate-based flame retardant in the base material sheet is within the range described above, the base material sheet exhibits further excellent strength.

When the base material sheet contains a metal phosphinate-based flame retardant, the content of the metal phosphinate-based flame retardant in the base material sheet is preferably 4.7% by mass or more, and 6.9% by mass or more, based on the amount of the base material sheet being defined as 100 mass %. The content of the metal phosphinate-based flame retardant in the base material sheet is preferably 23.1 mass % or less, and more preferably 16.7 mass % or less. Since the lower limit of the content of the metal phosphinate-based flame retardant in the base material sheet is within the range described above, the decorative sheet has further enhanced flame retardance. Since the upper limit of the metal phosphinate-based flame retardant in the base material sheet is within the range described above, the base material sheet exhibits further excellent strength.

The base material sheet contains at least one resin selected from the group consisting of polyolefin-based resins and polyester-based resins.

Examples of the polyolefin-based resins include polyolefin-based thermoplastic resins. Specific examples include polyethylene, ethylene-α-olefin copolymers, polypropylene, polymethylpentene, polybutene, ethylene-propylene copolymers, propylene-butene copolymers, ethylene-vinyl acetate copolymers, ethylene-vinyl acetate copolymers, ethylene-vinyl acetate copolymers, ethylene-(meth)acrylic acid copolymers, ethylene-(meth)acrylic ester copolymers, and the like. Among these, polypropylene is preferred.

The polyester-based resins can be, for example, polyester-based thermoplastic resins. Examples include polyethylene terephthalate, highly heat-resistant polyalkylene terephthalate (e.g., trade name "PET-G" (produced by Eastman Chemical Company), which is polyethylene terephthalate prepared by replacing a portion of ethylene glycol with 1,4-cyclohexane dimethanol, diethylene glycol, or the like), polybutylene terephthalate, polyethylene naphthalate, polyethylene naphthalate-isophthalate copolymers, and the like. Among these, highly heat-resistant polyalkylene terephthalate is preferred.

The thickness of the base material sheet is preferably 20 to 300 μm, and more preferably 40 to 200 μm. The base material sheet may be colored, if needed. The base material sheet may also be subjected to a surface treatment, such as corona discharge treatment, plasma treatment, or ozone treatment. Alternatively, a primer, which is a base paint for improving adhesion to an adjacent layer, may be applied.

Picture Pattern Layer

The picture pattern layer is formed of a patterned layer and/or a solid ink layer. The picture pattern layer can be formed by printing, such as gravure printing, offset printing, silk screen printing, or ink jet printing. Examples of patterns in the patterned layer include wood grain patterns, marble grain patterns, textile patterns, leather patterns, geometric figures, letters, symbols, line drawings, various abstract patterns, floral patterns, landscapes, characters, and the like. The solid ink layer can be obtained by solid printing with color inks. The picture pattern layer is formed of either the patterned layer or solid ink layer, or both.

The inks usable for the picture pattern layer can be obtained in the following manner. As a vehicle, one of or a mixture of two or more of the following compounds are used: chlorinated polyolefins such as chlorinated polyethylene and chlorinated polypropylene; polyesters; polyurethanes formed from isocyanate and polyol; polyacrylic resins; polyvinyl acetates; polyvinyl chlorides; vinyl chloride/vinyl acetate copolymers; cellulose-based resins; polyamide-based resins; and the like. A pigment, a solvent, various adjuvants, and the like are added to the mixture, and the resulting mixture is formed into an ink. Among these, from viewpoint of environmental issues, adhesion to the surface subjected to printing, etc., the use of one member or a mixture of two or more members selected from polyesters, polyurethanes formed from isocyanate and polyol, polyacrylic resins, and polyamide-based resins is preferable.

Transparent Adhesive Layer

The transparent adhesive layer is placed between the picture pattern layer and the transparent resin layer, as necessary. For example, the transparent adhesive layer can be obtained by applying and drying a known adhesive for use in dry lamination, such as a two-component-curable urethane resin.

The thickness of the transparent adhesive layer after drying is preferably about 0.1 to 30 μm, and more preferably about 1 to 5 μm.

Transparent Resin Layer

In the decorative sheet of the present invention, the transparent resin layer is one of the thermoplastic resin layers that may contain a metal phosphinate-based flame retardant, as described above.

When the transparent resin layer contains a metal phosphinate-based flame retardant, the content of the metal phosphinate-based flame retardant in the transparent resin layer is preferably 5 parts by mass or more, more preferably 7.5 parts by mass or more, based on the amount of at least one member selected from the group consisting of polyolefin-based resins and polyester-based resins in the transparent resin layer being defined as 100 parts by mass. The content of the metal phosphinate-based flame retardant in the transparent resin layer is preferably 30 parts by mass or less, and 20 parts by mass or less. Since the lower limit of the content of the metal phosphinate-based flame retardant in the transparent resin layer is within the range described above, the decorative sheet has further enhanced flame retardance. On the other hand, since the upper limit of the content of metal phosphinate-based flame retardant in the transparent resin layer is within the range described above, the decorative sheet has further enhanced sharpness.

When the transparent resin layer contains a metal phosphinate-based flame retardant, the content of the metal phosphinate-based flame retardant in the transparent resin layer is preferably 4.7 mass % or more, and more preferably 6.9 mass % or more, based on the amount of the transparent resin layer being defined as 100 mass %. The content of the metal phosphinate-based flame retardant in the transparent resin layer is preferably 23.1 mass % or less, and more preferably 16.7 mass % or less. Since the lower limit of the metal phosphinate-based flame retardant content in the transparent resin layer is within the range described above, the decorative sheet has further enhanced flame retardance. Since the upper limit of the content of the metal phosphinate-based flame retardant in the transparent resin layer is within the range described above, the decorative sheet has further enhanced sharpness.

The transparent resin layer contains at least one resin selected from the group consisting of polyolefin-based resins and polyester-based resins.

The polyolefin-based resins can be, for example, polyolefin-based thermoplastic resins. Examples include polyethylene, ethylene-α olefin copolymers, polypropylene, polymethylpentene, polybutene, ethylene-propylene copolymers, propylene-butene copolymers, ethylene-vinyl acetate copolymers, saponified products of ethylene-vinyl acetate copolymers, ethylene-(meth)acrylic acid copolymers, ethylene-(meth)acrylic acid ester copolymers, and the like. Among these, polypropylene is preferred.

The polyester-based resins can be, for example, polyester-based thermoplastic resins. Examples include polyethylene terephthalate, highly heat-resistant polyalkylene terephthalate (e.g., trade name "PET-G" (produced by Eastman Chemical Company), which is polyethylene terephthalate prepared by replacing a portion of ethylene glycol with 1,4-cyclohexane dimethanol, diethylene glycol, or the like), polybutylene terephthalate, polyethylene naphthalate, polyethylene naphthalate-isophthalate copolymers, and the like. Among these, highly heat-resistant polyalkylene terephthalate is preferred.

The transparent resin layer may be colored, as long as it has transparency. In this case, a colorant may be added to the thermoplastic resin. As the colorant, a pigment or a dye that is used for the picture pattern layer can be used.

The transparent resin layer may contain various kinds of additives, such as a filler, a matting agent, a foaming agent, a lubricant, an antistatic agent, an antioxidant, an ultraviolet absorber, a light stabilizer, a radical scavenger, and a soft component (e.g., rubber).

The filler is not particularly limited as long as it does not impair the transparency of the transparent resin layer. In terms of further improving the sharpness of the decorative sheet, a filler that has an average particle diameter of not more than the wavelength of visible light is preferable. Examples of fillers include inorganic fillers, such as silica, calcium carbonate, talc, and clay.

The layer into which a filler is to be incorporated is not limited to the transparent resin layer. At least one of the thermoplastic resin layers preferably contains a filler. The layer containing a metal phosphinate-based flame retardant preferably also contains a filler. More specifically, at least one of the thermoplastic resin layers preferably contains both a metal phosphinate-based flame retardant and a filler.

When at least one of the thermoplastic resin layers, in particular, a transparent resin layer, contains a metal phosphinate-based flame retardant, the transparent resin layer preferably further contains an inorganic filler having a polar group on its surface. When the transparent resin layer containing the metal phosphinate-based flame retardant contains an inorganic filler having a polar group on its surface, the sharpness and flame retardance of the decorative sheet are further improved. This is considered to be based on the following mechanism: due to the attraction of the polar part of the metal phosphinate-based flame retardant to polar groups on the surface of the inorganic filler having polar groups, the metal phosphinate-based flame retardant is present on the surface, which enhances the dispersibility. As the inorganic filler having a polar group on the surface, hydrophilic inorganic fillers can be used. Examples include inorganic fillers having on the surface a hydroxyl group, such as a silanol group. More specifically, hydrophilic silica can be used.

The silica for use as filler may be natural or synthetic, and may be crystalline or amorphous. The synthetic amorphous silica may be prepared by either a wet or dry method. Examples of the method for preparing synthetic wet silica by a wet method include, but are not limited to, the sedimentation method, the gel method, and the like. Examples of the method for preparing synthetic dry silica include, but are not limited to, the combustion method, the arc method, and the like. In terms of further improving the sharpness of the decorative sheet, the silica is preferably a silica having a small average particle diameter, and more preferably fumed silica obtained by the combustion method and hydrophilic fumed silica.

The filler such as hydrophilic fumed silica preferably has a BET specific surface area of 50 $m^2/g$ or more, more preferably 130 $m^2/g$ or more, and even more preferably 200 $m^2/g$ or more. Since the lower limit of the BET specific surface area of the filler is within the range described above, the average particle diameter is small. In the case of hydrophilic fumed silica, the amount of silanol increases; therefore, a decrease in transparency of the transparent resin layer due to the addition of the filler is further suppressed, and the dispersibility of the metal phosphinate-based flame retardant is further improved, thus further enhancing the sharpness and flame retardance of the decorative sheet. Further, a lower limit of the BET specific surface area of the filler within the range described above enhances the flame retardance of the decorative sheet, and makes it possible to reduce the content of the metal phosphinate-based flame retardant.

In the present specification, the BET specific surface area refers to a BET specific surface area measured by the nitrogen adsorption method according to DIN 66131.

The hydrophilic fumed silica for use as a filler can be commercially available. Examples of such commercial products include AEROSIL 50, AEROSIL 130, AEROSIL 200, AEROSIL 300, and AEROSIL 380, all produced by Nippon Aerosil Co., Ltd.

When the transparent resin layer contains a metal phosphinate-based flame retardant and a filler, the content of the filler in the transparent resin layer is preferably 50 parts by mass or more, more preferably 100 parts by mass or more, and more preferably 200 parts by mass or more, per 100 parts by mass of the content of the metal phosphinate-based flame retardant in the transparent resin layer. When the lower limit of the filler content in the transparent resin layer is in the above range, the sharpness of the decorative sheet is further improved. The content of the filler in the transparent resin layer is preferably 25 parts by mass or less, more preferably 20 parts by mass, and even more preferably 10 parts by mass, per 100 parts by mass of the content of the resin component in the transparent resin layer.

The thickness of the transparent resin layer is preferably 60 μm or more, and more preferably 80 μm or more. On the other hand, the thickness of the transparent resin layer is preferably 300 μm or less, and more preferably 200 μm or less. When the lower limit of the thickness of the transparent resin layer is in the range described above, the scratch resistance and abrasion resistance of the decorative sheet are further improved. Further, since the upper limit of the thickness of the transparent resin layer is in the range described above, the fire spread resistance of the decorative sheet is further improved.

The surface of the transparent resin layer may be subjected to a surface treatment, such as corona discharge treatment, ozone treatment, plasma treatment, ionizing radiation treatment, and dichromic acid treatment, as necessary. The surface treatment may be performed according to the usual methods for each treatment.

A primer layer (a primer layer for facilitating the formation of a surface-protecting layer) may be formed on the surface of the transparent resin layer.

The primer layer can be formed by applying a known primer agent to the transparent resin layer. Examples of primer agents include urethane resin-based primer agents comprising an acrylic-modified urethane resin; resin-based primer agents comprising a block copolymer of acrylic resin and urethane; and the like.

The thickness of the primer layer is not limited; however, it is usually 0.1 to 10 μm, and preferably about 1 to 5

Surface-Protecting Layer

The surface-protecting layer (transparent surface-protecting layer) is provided to impart surface properties required of the decorative sheet, such as scratch resistance, abrasion resistance, water resistance, and stain resistance.

The decorative sheet of the present invention preferably comprises a surface-protecting layer on the outermost surface. Since the decorative sheet of the present invention comprises a surface-protecting layer on the outermost surface and the surface-protecting layer comprises at least one curable resin as described below, the surface-protecting layer delays the generation of combustion gas due to resin decomposition in the layers below the surface-protecting layer in case of fire or the like, thereby suppressing fire spread and achieving further enhanced flame retardance.

The resin that forms the surface-protecting layer preferably contains at least one curable resin, such as thermosetting resins or ionizing radiation-curable resins. In particular, ionizing radiation-curable resins are preferred from the viewpoint of high surface hardness, productivity, etc. Further, from the viewpoint of further improving the weather resistance, electron beam-curable resins are the most preferable. Furthermore, from the viewpoint of delaying the generation of combustion gas due to resin decomposition of layers below the surface-protecting layer in case of fire or the like, as described above, ionizing radiation-curable resins, which are curable resins with a high crosslink density, are preferred among the curable resins; and electron beam-curable resins are more preferable.

Examples of thermosetting resins include unsaturated polyester resins, polyurethane resins (including two-component-curable polyurethane), epoxy resins, amino alkyd resins, phenol resins, urea resins, diallyl phthalate resins, melamine resins, guanamine resins, melamine/urea copolycondensation resins, silicone resins, polysiloxane resins, and the like.

Crosslinking agents, curing agents such as polymerization initiators, and polymerization accelerators can be added to the above resins. For example, as a curing agent, isocyanate, an organic sulfonic acid salt, or the like can be added to an unsaturated polyester resin, a polyurethane resin, or the like; organic amine and the like can be added to an epoxy resin; and a peroxide such as methyl ethyl ketone peroxide and a radical initiator such as azoisobutyronitrile can be added to an unsaturated polyester resin.

The method for forming the surface-protecting layer using a thermosetting resin can be, for example, a method comprising applying a solution of the thermosetting resin by a coating method, such as roll coating or gravure coating, followed by drying and curing. The amount of the solution applied is about 5 to 50 μm, and preferably about 5 to 40 μm, on a solids basis.

The ionizing radiation-curable resin is not limited, as long as it induces a crosslinking polymerization reaction upon irradiation with ionizing radiation, and is converted into a three-dimensional polymer structure. For example, one or more types of prepolymers, oligomers, and monomers that have, in the molecule, a polymerizable unsaturated bond crosslinkable by irradiation with ionizing radiation, or an epoxy group can be used. Examples include acrylate resins, such as urethane acrylate, polyester acrylate, and epoxy acrylate; silicone resins, such as siloxane; polyester resins; epoxy resins; and the like.

Examples of ionizing radiation include visible rays, ultraviolet rays (near-ultraviolet rays, vacuum ultraviolet rays, etc.), X rays, electron beams, ionic lines, and the like. Of these, ultraviolet rays and/or electron beams are preferable; and electron beams are more preferable.

Examples of the source of ultraviolet rays include ultra-high-pressure mercury lamps, high-pressure mercury lamps, low-pressure mercury lamps, carbon arc lamps, black-light fluorescent lamps, metal halide lamps, and like light sources. The wavelength of ultraviolet rays is about 190 to 380 nm.

Examples of the electron beam source include various electron beam accelerators, such as Cockcroft-Walton, Van de Graaff, resonance transformer, insulated core transformer, linear, Dynamitron, and high-frequency accelerators. The energy of the electron beam is preferably about 100 to 1000 keV, and more preferably about 100 to 300 keV. The exposure dose of the electron beam is preferably about 2 to 15 Mrad.

Although the ionizing radiation-curable resin is sufficiently cured by irradiation with an electron beam, it is preferable to add a photopolymerization initiator (sensitizer) when the resin is cured by irradiation with ultraviolet rays.

The photopolymerization initiator used in the case of a resin having a radically polymerizable unsaturated group is, for example, at least one member selected from acetophenones, benzophenones, thioxanthones, benzoin, benzoin methyl ether, Michler's benzoyl benzoate, Michler's ketone, diphenyl sulfide, dibenzyl disulfide, diethyl oxide, triphenyl biimidazole, isopropyl-N,N-dimethylaminobenzoate, and the like. The photopolymerization initiator used in the case of a resin having a cation polymerizable functional group is, for example, at least one member selected from aromatic diazonium salts, aromatic sulfonium salts, metallocene compounds, benzoin sulfonate, furyloxy sulfoxonium diallyliodosyl salts, and the like.

The amount of the photopolymerization initiator added is not particularly limited; however, it is generally about 0.1 to 10 parts by mass per 100 parts by mass of the ionizing radiation-curable resin.

The method for forming the surface-protecting layer using an ionizing radiation-curable resin can be, for example, a method in which a solution of the ionizing radiation-curable resin is applied by a coating method, such as gravure coating or roll coating. The thickness of the surface-protecting layer is about 10 to 50 µm, and preferably about 15 to 40 µm.

The thickness of the surface-protecting layer is preferably 4 µm or more, more preferably 8 µm or more, and even more preferably 10 µm or more, and particularly preferably 12 µm or more. The thickness of the surface-protecting layer is preferably 50 µm or less, more preferably 40 µm or less, even more preferably 30 µm or less, particularly preferably 20 µm or less, and most preferably 15 µm or less. Since the lower limit of the thickness of the surface-protecting layer is within the range described above, the decorative sheet has further enhanced scratch resistance and abrasion resistance. On the other hand, since the upper limit of the thickness of the surface-protecting layer is within the range described above, the decorative sheet has further enhanced flame retardance.

In the present specification, when fine particles 16 project from the surface of the surface-protecting layer, the thickness of the surface-protecting layer is measured at a location other than the projecting fine particles 16, while the surface at the location other than the projecting fine particles 16 is regarded as the surface of the surface-protecting layer, shown as "ts" in FIGS. 1 to 4. When a projection and depression pattern is formed on the decorative sheet by embossing as shown in FIGS. 1 to 4, the thickness of the surface-protecting layer is measured at a location other than the projection and depression pattern.

To further impart scratch resistance and wear resistance to the surface-protecting layer, or to reduce the gloss, the fine particles 16 may be added, as shown in FIGS. 1 to 4. Examples of usable fine particles include inorganic fillers. Examples of inorganic fillers include acrylic beads, mica, powdered aluminum oxide, silicon carbide, silicon dioxide, calcium titanate, barium titanate, magnesium pyroborate, zinc oxide, silicon nitride, zirconium oxide, chromium oxide, iron oxide, boron nitride, diamonds, rigid sand, glass fiber, and the like.

The average particle size of the fine particles is not particularly limited. To further impart scratch resistance and wear resistance to the surface-protecting layer, the average particle size of the fine particles is preferably greater than the thickness of the surface-protecting layer. Fine particles having an average particle size of larger than the thickness of the surface-protecting layer further increase the scratch resistance and wear resistance of the decorative sheet. In order to further impart scratch resistance and wear resistance to the surface-protecting layer, the average particle size of the fine particles is preferably more than 15 µm, and 50 µm or less, more preferably 16 to 35 µm, and most preferably 16 to 20 µm.

The average particle size of the fine particles used as a matting agent for reducing the gloss of the surface-protecting layer is preferably 3 to 15 µm, more preferably 4 to 15 µm, and most preferably 8 to 15 µm. When the average particle size of the fine particles used as a matting agent is within the above range, the gloss of the surface-protecting layer can be further reduced.

To impart scratch resistance to the surface-protecting layer, fine particles having a smaller average particle size may be used. The average particle size of the fine particles to impart scratch resistance to the surface-protecting layer is preferably 1 to 5 µm, more preferably 3 to 5 µm, and even more preferably 3 to 4 µm. When the average particle size of the fine particles to impart scratch resistance to the surface-protecting layer is within the above range, the scratch resistance of the surface-protecting layer is further increased.

In the present specification, the average particle size of the fine particles refers to a mode diameter. The mode diameter is a local maximum particle size in a particle size distribution, and the most frequently occurring particle size.

The amount of the inorganic filler added is about 1 to 80 parts by mass per 100 parts by mass of the ionizing radiation-curable resin.

The surface-protecting layer preferably contains the metal phosphinate-based flame retardant. Since the surface-protecting layer contains the metal phosphinate-based flame retardant, the flame retardance is further improved by char formation and trapping of combustion gases against the heat applied from the surface of the decorative sheet of the present invention.

The content of the metal phosphinate-based flame retardant in the surface-protecting layer is preferably 1 to 20 parts by mass per 100 parts by mass of ionizing radiation-curable resin, with 3 to 10 parts by mass being more preferable.

Synthetic-resin Backer Layer

In the decorative sheet of the present invention, the synthetic-resin backer layer is one of the thermoplastic resin layers that may contain a metal phosphinate-based flame retardant, as described above. Since the decorative sheet comprises a synthetic-resin backer layer, the decorative plate has further improved impact resistance.

When the synthetic-resin backer layer contains a metal phosphinate-based flame retardant, the content of the metal phosphinate-based flame retardant in the synthetic-resin backer layer is preferably 5 parts by mass or more, and more preferably 7.5 parts by mass or more, based on the amount of the resin in the synthetic-resin backer layer being defined as 100 parts by mass. The content of the metal phosphinate-based flame retardant in the synthetic-resin backer layer is preferably 30 parts by mass or less, and preferably 20 parts by mass or less. Since the lower limit of the content of the metal phosphinate-based flame retardant in the synthetic-resin backer layer is within the range described above, the decorative sheet has further improved flame retardance. Since the upper limit of the content of the metal phosphinate-based flame retardant in the synthetic-resin backer layer is within the range described above, the synthetic-resin backer layer exhibits further excellent strength.

Examples of the resin that constitutes the synthetic-resin backer layer include polypropylene, ethylene-vinyl alcohol copolymers, polymethylene, polymethyl pentene, polyethylene terephthalate, highly heat-resistant polyalkylene terephthalate (e.g., trade name "PET-G" (produced by Eastman Chemical Company), which is polyethylene terephthalate prepared by replacing a portion of ethylene glycol with 1,4-cyclohexane dimethanol, diethylene glycol, etc.), polybutylene terephthalate, polyethylene naphthalate, polyethylene naphthalate-isophthalate copolymers, polycarbonate, polyarylate, polyimide, polystyrene, polyamide, ABS, and the like. These resins can be used singly, or in a combination of two or more.

The thickness of the synthetic-resin backer layer is preferably 0.1 to 0.6 mm, more preferably 0.15 to 0.45 mm, and even more preferably 0.20 to 0.40 mm. A lower limit of the thickness of the synthetic-resin backer layer within the range described above further increases the impact resistance of the decorative sheet. An upper limit of the thickness of the synthetic-resin backer layer within the range described above further reduces the warpage of the decorative sheet.

Each of the layers explained above can be laminated, for example, in the following manner. A picture pattern layer (solid colored layer and/or patterned layer) is formed on one surface of a base material sheet by printing. A transparent resin layer is then formed on the picture pattern layer via a known adhesive for use in dry lamination, such as a two-component-curable urethane resin, by the dry lamination method, T-die extrusion method, or the like. A surface-protecting layer is further formed thereon to form an intermediate, and a synthetic-resin backer layer prepared by the T-die extrusion method or the like is laminated on the base material sheet side of the intermediate by thermal lamination.

The total thickness of the decorative sheet is preferably 110 μm or more, and more preferably 120 μm or more. The total thickness of the decorative sheet is also preferably 600 μm or less, and more preferably 400 μm or less. A lower limit of the total thickness of the decorative sheet within the above range further increases the scratch resistance and wear resistance of the decorative sheet. An upper limit of the total thickness of the decorative sheet within the above range further increases the resistance of the decorative sheet to fire spread.

In the present specification, when the fine particles 16 project from the surface of the surface-protecting layer, the total thickness of the decorative sheet, as shown as "td" in FIGS. 1 to 4, is measured at a location other than the projecting fine particles 16, while the surface at the location other than the projecting fine particles 16 is regarded as the surface of the decorative sheet. When a projection and depression pattern is formed on the decorative sheet by embossing as shown in FIGS. 1 to 4, the total thickness of the decorative sheet is measured at a portion other than the projection and depression pattern.

Embossing may be performed from the transparent resin layer side or the surface-protecting layer side (the upper side of the decorative sheet) to provide a concave-convex pattern on the decorative sheet. The concave-convex pattern can be formed by hot press, hairline processing, etc. Examples of the concave-convex patterns include a wood grain pattern, a slate pattern, a textile surface texture, a matte pattern, a grain pattern, a hairline pattern, a line groove pattern, and the like.

In the present specification, the total thickness or other layer thickness of the decorative sheet are values measured at the locations where the concave-convex patterns are not formed.

The various additives to be added to the layers of the decorative sheet of the present invention described above (e.g., fine particles contained in the surface-protecting layer; the metal phosphinate-based flame retardant contained in the thermoplastic resin layer; etc.) are preferably formed into vesicles. The method for forming various additives into vesicles is not particularly limited, and known methods can be used to form the vesicles. The supercritical reverse phase evaporation method is particularly preferable.

The supercritical reverse phase evaporation method is explained in detail below. The supercritical reverse phase evaporation method refers to a method of adding an aqueous phase containing various additives as water-soluble or hydrophilic encapsulation materials to a mixture in which a material for forming the outer membrane of the vesicle is uniformly dissolved in carbon dioxide in a supercritical state or carbon dioxide at a temperature or pressure condition equal to or greater than the supercritical point, thereby forming a capsule-like vesicle in which the various additives as encapsulation materials are encapsulated with a single membrane. "Carbon dioxide in a supercritical state" refers to carbon dioxide in a supercritical state at a temperature equal to or greater than the critical temperature (30.98° C.), and a pressure equal to or greater than the critical pressure (7.3773±0.0030 MPa); and "carbon dioxide at a temperature or pressure condition equal to or greater than the critical point" refers to carbon dioxide under a condition in which only the critical temperature or only the critical pressure exceeds the critical condition. This method can produce a single-walled lamellar vesicle having a diameter of 50 to 800 nm. In general, "vesicle" is the general name of a folliculus having a spherically closed membrane structure containing a liquid phase. In particular, those having an outer membrane formed of a biological lipid such as a phospholipid are called liposomes.

Examples of phospholipids include glycerophospholipids such as phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soybean lecithin, and hydrogenated soybean lecithin; and sphingophospholipids such as sphingomyelin, ceramide phosphorylethanolamine, and ceramide phosphorylglycerol.

Other examples of the materials that constitute the outer layer also include nonionic surfactants; and dispersants, such as a mixture of these surfactants with cholesterols or triacylglycerols.

Examples of nonionic surfactants include polyglycerolether, dialkylglycerol, polyoxyethylene hardened castor oil, polyoxyethylene alkylether, polyoxyethylene sorbitan fatty acid ester, sorbitan fatty acid ester, polyoxyethylene polyoxypropylene copolymers, polybutadiene-polyoxyethylene copolymers, polybutadiene-poly-2-vinylpyridine, polystyrene-polyacrylic acid copolymers, polyethylene oxide-polyethyl ethylene copolymers, polyoxyethylene-polycaprolactam copolymers, and the like. These surfactants can be used singly or in a combination of two or more.

Examples of the cholesterols include cholesterol, α-cholestanol, β-cholestanol, cholestane, desmosterol (5,24-cholestadiene-3β-ol), sodium cholate, cholecalciferol, and the like. These cholesterols can be used singly or in a combination of two or more.

The outer membrane of the liposome may be formed of a mixture of phospholipid and a dispersant. By forming an outer layer as a liposome formed of a phospholipid, the decorative sheet of the present invention ensures desirable compatibility between the resin composition, which is the main component of each layer, and various additives.

Since the decorative sheet of the present invention has the above structure, fire does not readily spread even when the decorative sheet is laminated on a base material having low thermal conductivity. Therefore, the decorative sheet of the present invention can be used as a decorative sheet for laminating on a base material having a thermal conductivity of less than 0.1 W/(m·K); and even when the decorative sheet is laminated on such a base material, fire does not easily spread. For this reason, the decorative sheet of the present invention can be preferably used as a decorative sheet for interior materials, and is particularly suitable for use as a decorative sheet for floors.

2. Decorative Plate

The decorative plate of the present invention is a decorative plate comprising the decorative sheet described above on a base material.

Decorative Sheet

The decorative sheet that constitutes the decorative plate of the present invention can be the decorative sheet of the present invention explained above.

Base Material

Figure 5:
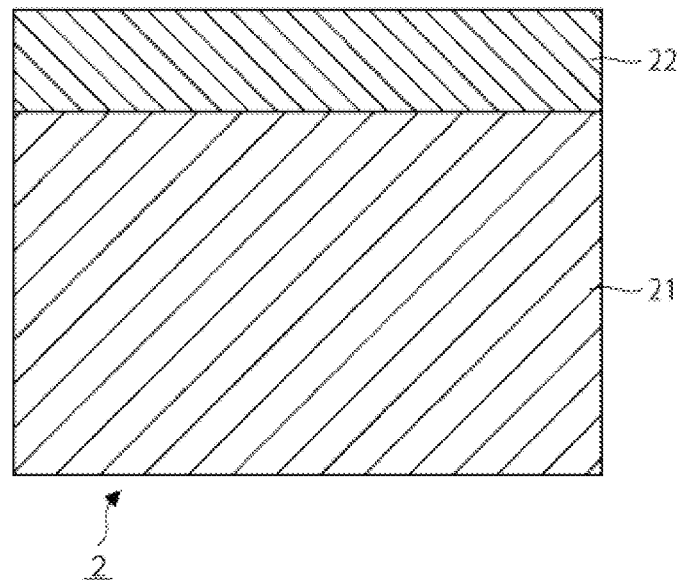
FIG. 5 is a schematic diagram illustrating an example of the layer structure of a base material, which is a component of the decorative plate of the present invention.
Figure 6:
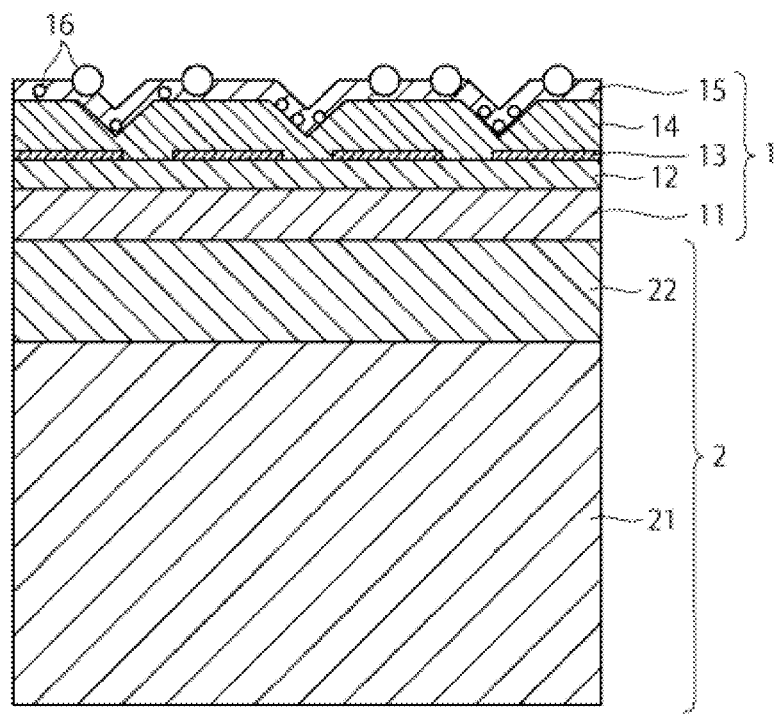
FIG. 6 is a schematic diagram illustrating an example of the layer structure of the decorative plate according to the present invention.
Figure 7:
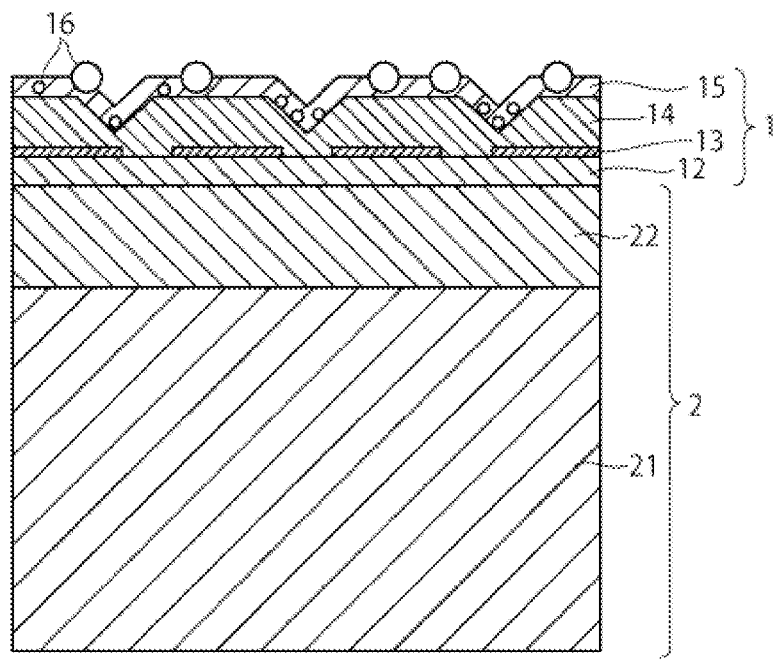
FIG. 7 is a schematic diagram illustrating an example of the layer structure of the decorative plate according to the present invention.
Figure 8:
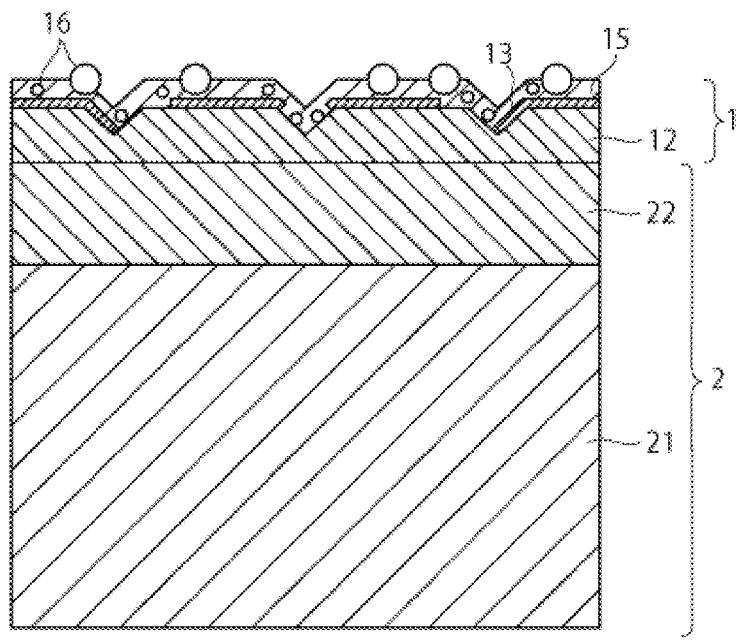
FIG. 8 is a schematic diagram illustrating an example of the layer structure of the decorative plate according to the present invention.
Figure 9:
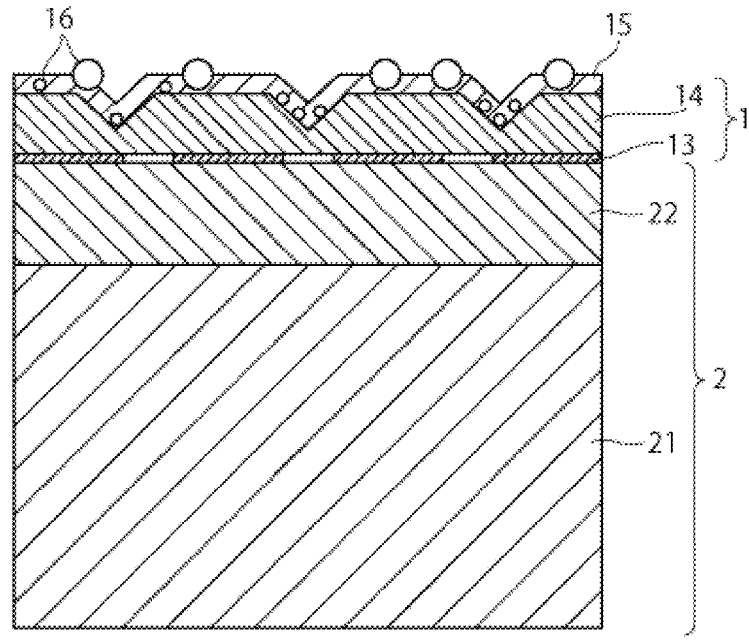
FIG. 9 is a schematic diagram illustrating an example of the layer structure of the decorative plate according to the present invention.

The material of the base material is not limited. For example, an inorganic base material, such as an aluminum plate or other metal plates, may be used; or a resin base material containing a filler such as an inorganic material in a synthetic-resin may be used. For example, as shown in FIG. 5, a wooden base material obtained by laminating a surface material 22 made of a material having a thermal conductivity in the above range on a wooden plate 21 usually used for a decorative plate, such as a floor decorative plate, may be used. FIGS. 6 to 9 each show an example of the layer structure of the decorative plate of the present invention comprising the base material shown in FIG. 5. In FIG. 6, the surface material 22 of the base material 2 and the synthetic-resin backer layer 11 of the decorative sheet 1 are bonded, whereby a decorative sheet 1 is laminated on the base material 2 to form a decorative plate. In FIGS. 7 and 8, the surface material 22 of the base material 2 and the base material sheet 12 of the decorative sheet 1 are bonded, whereby a decorative sheet 1 is laminated on the base material 2 to form a decorative plate. In FIG. 9, the surface material 22 of the base material 2 and a picture pattern layer 13 (a solid colored layer and/or a patterned layer) of the decorative sheet 1 are bonded, whereby a decorative sheet 1 is laminated on the base material 2 to form a decorative plate.

The surface material is not limited, and examples include cork, paulownia, medium density fiberboards (MDF), high density fiberboards (HDF), and the like. These surface materials can be used in a combination. Of these, cork is preferably used, because heat retention and cushioning properties can be imparted to the decorative plate. That is, the base material preferably includes a cork layer on the decorative sheet side.

The thickness of the surface material is not particularly limited; and is preferably 1.0 to 5.0 mm, and more preferably 1.0 to 2.5 mm.

The wooden plate is not particularly limited, and examples include medium-density fiberboard (MDF), high-density fiberboard (HDF), plywood, and the like. Of these, plywood is preferably used.

The thickness of the wooden plate is not particularly limited; and is preferably 4.0 to 15.0 mm, and more preferably 5.0 to 10.0 mm.

The method for laminating the surface material and the wooden plate is not particularly limited, and lamination can be performed by a conventionally known method, such as using an adhesive. The adhesive is not particularly limited, and known woodworking adhesives can be widely used. Examples of adhesives include adhesives containing, as an active ingredient, polyvinyl acetate, polyvinyl chloride, urethane, acrylic resin, acrylic urethane, vinyl chloride-vinyl acetate copolymers, ethylene-acrylic acid copolymers, ionomers, butadiene-acrylic nitrile rubber, neoprene rubber, natural rubber, or the like. Examples also include thermosetting adhesives, such as melamine-based adhesives, phenol-based adhesives, urea-based (vinyl acetate-urea-based) adhesives, and the like.

The base material that constitutes the decorative plate of the present invention may have a thermal conductivity of less than 0.1 W/(m·K) on a side to which the decorative sheet is bonded. In the present specification, the thermal conductivity of the base material is measured by the following measurement method.

Method for Measuring Thermal Conductivity of Base Material

The material that forms the layer of the base material on the side to which the decorative sheet is bonded is cut into circles, each having a diameter of 40 mm, to prepare samples for measurement. An even number of the samples for measurement are stacked in the thickness direction so that the thickness is more than 15 mm. Subsequently, a sensor is placed in the middle of the number of the stacked samples for measurement, and the thermal conductivity is measured using the hot disk method in accordance with ISO 22007-2:2008. The air layer contained between the adjacent samples for measurement when the samples are stacked is negligible.

An example of the method for measuring thermal conductivity is described below. Corks each having a diameter of 40 mm and a thickness of 1.5 mm were prepared as samples for measurement. 30 samples for measurement are stacked so that the total thickness of the samples is more than 15 mm when they are stacked, thereby obtaining a 45-mm-thick stack. Subsequently, a sensor is placed between the 15th and 16th samples for measurement (22.5 mm position), i.e., at half the thickness of the stack, and the thermal conductivity is measured using the hot disk method in accordance with ISO 22007-2:2008.

In the case of using corks each having a thickness of 2.0 mm as samples for measurement, if 20 samples are stacked, the thickness of the resulting stack is 40 mm. Accordingly, a sensor may be placed between the 10th and 11th samples for measurement.

In the case of using corks each having a thickness of 1.0 mm as samples for measurement, if 40 samples are stacked, the thickness of the resulting stack is 40 mm. Accordingly, a sensor may be placed between the 20th and 21st samples for measurement.

The method for laminating the decorative sheet on the front surface of the base is not particularly limited. The decorative sheet can be laminated by a conventionally known method, for example, by forming an adhesive layer on the front surface of the base material.

The thickness of the adhesive layer is not particularly limited; and the thickness after drying is preferably 0.1 to 100 μm, more preferably 0.1 to 30 μm, and even more preferably 1 to 20 μm.

Examples of the adhesive used in the adhesive layer include water-soluble emulsion-based adhesives, polyester-based adhesives, acrylic adhesives, urethane-based adhesives, and the like. These adhesives can be used singly, or in a combination of two or more.

The decorative plate of the present invention, which has the above structure, has excellent flame retardance and high sharpness. Therefore, the decorative plate of the present invention can be preferably used as a decorative plate for interior materials, especially as a decorative plate for floors.

EXAMPLES

The present invention is described in more detail below with reference to Examples and Comparative Examples. However, the present invention is not limited to the Examples.

Example 1

Production of Decorative Sheet

A 60-μm-thick opaque colored polypropylene film was prepared as a base material sheet. Subsequently, after both surfaces of the base material sheet were subjected to corona discharge treatment, a primer layer of a two-component-curable urethane resin (thickness: 2 μm) was formed on the back surface of the base material sheet, and a picture pattern layer was formed on the front surface of the base material sheet using an acrylic urethane-based resin-containing curable printing ink by the gravure printing method. Further, an adhesive of two-component-curable urethane resin was applied to the picture pattern layer to form a transparent adhesive layer. Further, a transparent polypropylene resin containing the metal phosphinate-based flame retardant described below was thermally melted and extruded on the adhesive layer using a T-die extruder, thus forming a thermoplastic transparent resin layer (thickness: 100 μm).

Transparent polypropylene resin: 100 parts by mass
Metal phosphinate-based flame retardant (product name: Pekoflam STC (produced by Archroma); aluminum phosphinate): 10 parts by mass Subsequently, after the surface of the transparent resin layer was subjected to corona discharge treatment, a two-component-curable urethane resin primer layer (thickness 2 μm) was formed on the transparent resin layer. Further, an electron beam-curable resin composition containing a urethane (meth)acrylate oligomer was applied to the primer layer by the gravure coating method, followed by drying; after which irradiation with an electron beam was conducted at an acceleration voltage of 165 keV with a dose of 30 kGy, thereby forming a surface-protecting layer having a thickness of 15 μm.

Subsequently, the surface-protecting layer side was heated with a non-contact-type infrared heater to thereby soften the base material sheet and the transparent resin layer, and embossing was then immediately conducted by hot-pressing from the surface-protecting layer side to form a concave-convex pattern. The decorative sheet of Example 1 was thus produced by the production method described above.

The total thickness of the transparent resin layer and the base material sheet of the decorative sheet in Example 1 was 160 μm; and the content of the metal phosphinate-based flame retardant was 5.7 mass %, based on the total mass of the transparent resin layer and the base material sheet being defined as 100 mass %.

Production of Decorative Plate

A cork sheet having a thickness of 1.5 mm was bonded to 7.5-mm-thick plywood with an adhesive to prepare a wooden base material.

Subsequently, the surface of the base material sheet side of the decorative sheet is bonded to the surface of the cork sheet side of the wood base material via a two-component-curable water-soluble emulsion adhesive. The amount of the two-component-curable water-soluble emulsion adhesive applied was 130 g/m$^2$.

The following water-soluble emulsion adhesive was used.
Water-Soluble Emulsion Adhesive
  Base Resin: BA-10L, Japan Coating Resin Co., Ltd., modified-ethylene-vinyl acetate-based resin
  Curing Agent: BA-11B, Japan Coating Resin Co., Ltd., compositional ratio of base resin:curing agent=100:2.5 (on a mass basis)

Subsequently, a pressure of 10 kg/m$^2$ at 25° C. was applied, and curing was performed for 3 days to prepare a decorative plate.

Example 2

A decorative sheet and a decorative plate were produced in the same manner as in Example 1, except that the content of the metal phosphinate-based flame retardant in the transparent resin layer was changed to 5 parts by mass. The content of the metal phosphinate-based flame retardant was 3.0 mass %, based on the total mass of the transparent resin layer and the base material sheet being defined as 100 mass %.

Example 3

A decorative sheet and a decorative plate were produced in the same manner as in Example 1, except that the content of the metal phosphinate-based flame retardant in the transparent resin layer was changed to 30 parts by mass. The content of the metal phosphinate-based flame retardant was 14.4 mass %, based on the total mass of the transparent resin layer and the base material sheet being defined as 100 mass %.

Example 4

A decorative sheet and a decorative plate were produced in the same manner as in Example 1 except the following.

The base material sheet was a 100 μm-thick opaque colored polypropylene film and contained a metal phosphinate-based flame retardant and the composition of the base material sheet was as follows.

Polypropylene resin: 100 parts by mass
Metal phosphinate-based flame retardant (product name: Pekoflam STC (produced by Archroma); aluminum phosphinate): 30 parts by mass.

The transparent resin layer was configured to have a thickness of 60 μm and contain no metal phosphinate-base flame retardant.

The content of the metal phosphinate-based flame retardant in the obtained decorative sheet or decorative plate was 14.4 mass %, based on the total mass of the transparent resin layer and the base material sheet being defined as 100 mass %.

Example 5

A decorative sheet and a decorative plate were produced in the same manner as in Example 1 except that the transparent resin layer and the base material sheet contained a metal phosphinate-based flame retardant, and the compositions of the transparent resin layer and the base material sheet were as follows.

Transparent Resin Layer
  Polypropylene resin: 100 parts by mass
  Metal phosphinate-based flame retardant (product name: Pekoflam STC (produced by Archroma); aluminum phosphinate): 5 parts by mass
Base Material Sheet
  Polypropylene resin: 100 parts by mass
  Metal phosphinate-based flame retardant (product name: Pekoflam STC (produced by Archroma); aluminum phosphinate): 5 parts by mass The content of the metal phosphinate-based flame retardant in the obtained decorative sheet or decorative plate was 8.0 mass %, based on the total mass of the transparent resin layer and the base material sheet being defined as 100 mass %.

Example 6

A decorative sheet and a decorative plate were produced in the same manner as in Example 1, except that Exolit OP 950 (produced by Clariant; zinc phosphate) was used as a metal phosphinate-based flame retardant contained in the transparent resin layer. The content of the metal phosphinate-based flame retardant was 5.7 mass %, based on the total mass of the transparent resin layer and the base material sheet being defined as 100 mass %.

Example 7

A decorative sheet and a decorative plate were produced in the same manner as in Example 1, except that Exolit OP 945TP (produced by Clariant; aluminum phosphate) was used as a metal phosphinate-based flame retardant contained in the transparent resin layer. The content of the metal phosphinate-based flame retardant was 5.7 mass %, based on the total mass of the transparent resin layer and the base material sheet being defined as 100 mass %.

Comparative Example 1

A decorative sheet and a decorative plate were produced in the same manner as in Example 1, except that PX200 (produced by Daihachi Chemical Industry Co., Ltd.; condensed phosphate ester flame retardant) was used as a flame retardant contained in the transparent resin layer, and the content of the flame retardant in the transparent resin layer was 15 parts by mass. The content of the flame retardant was 8.2 mass %, based on the total mass of the transparent resin layer and the base material sheet being defined as 100 mass %.

Comparative Example 2

A decorative sheet and a decorative plate were produced in the same manner as in Example 1, except that FCP790 (produced by Suzuhiro Chemical Co., Ltd.; ammonium polyphosphate) was used as a flame retardant contained in the transparent resin layer, and the content of the flame retardant in the transparent resin layer was 30 parts by mass. The content of the flame retardant was 14.4% by mass, based on the total mass of the transparent resin layer and the base material sheet being defined as 100 mass %.

Evaluation

The properties of the decorative sheets and decorative plates thus obtained in the Examples and Comparative Examples were evaluated by the following methods.
Horizontal Burning (Flame Retardance: Resistance to Fire Spread)

Figure 10:
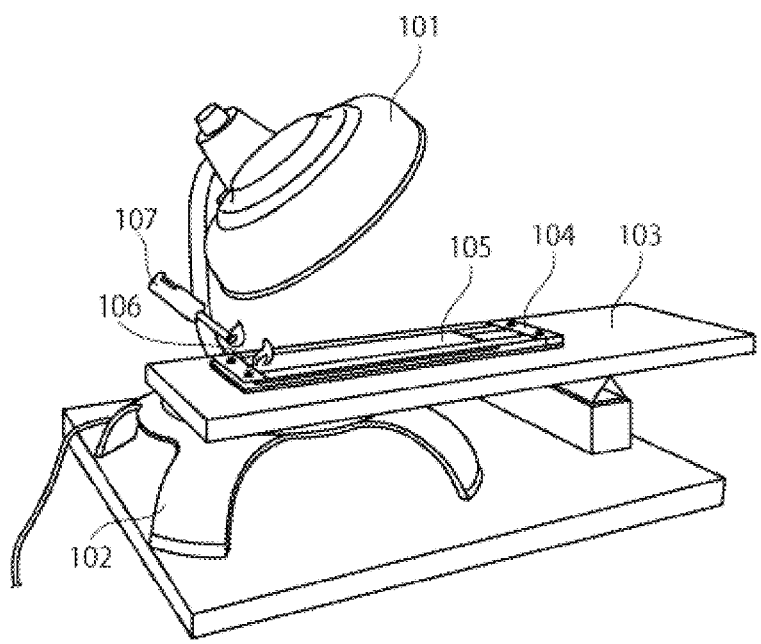
FIG. 10 is a schematic diagram illustrating a method for testing the resistance to fire spread.
Figure 11:
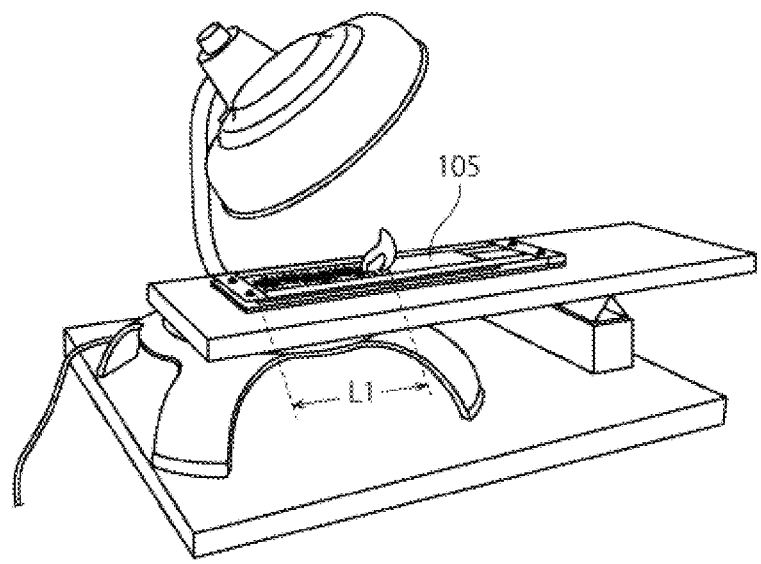
FIG. 11 is a schematic diagram illustrating a method for testing the resistance to fire spread.

A decorative plate was cut into a size of 9 cm×30 cm to make a test piece. As shown in FIGS. 10 and 11, a rectangular metal platform 103 was placed on a stand 102 of a commercially available household heater 101 (Zaigle Handsome SJ-100 (trade name)), and a test piece 105 was placed in a metal frame 104 set on the platform. The resistance to fire spread was tested under the conditions of a heater angle of 45° and a heater output dial of 4. More specifically, the test piece was pre-heated for 2 minutes using the household heater. Then, as shown in FIG. 10, the end 106 on the heater side in the longitudinal direction of the test piece was heated with a lighter 107 for 1 minute to ignite; and, as shown in FIG. 11, the fire was allowed to spread in the longitudinal direction of the test piece 105. Subsequently, the state of fire spread was visually observed, and the fire spread distance (L1) and burning duration was measured.
Fire Spread Distance (L1)

A test piece was ignited with a lighter; and the fire spread progression distance from initial ignition, excluding the flame of the lighter, was measured as the fire spread distance (L1), and evaluated according to the following evaluation criteria. Decorative plates evaluated as + or higher are evaluated as acceptable in actual use.
++: L1 is less than 5 cm.
+: L1 is 5 cm or more and less than 10 cm.
−: L1 is 10 cm or more.
Burning Duration A test piece was ignited with a lighter, and the burning duration from the initial ignition until self-extinguishing of the fire (excluding the flame of the lighter) was measured and evaluated according to the following evaluation criteria. Decorative plates evaluated as + or higher are evaluated as acceptable in actual use.
+++: The burning continued for less than 100 seconds, or no ignition occurred.
++: The burning continued for 100 seconds or more, but less than 300 seconds.
+: The burning continued for 300 seconds or more, but less than 600 seconds.
−: The burning continued for 600 seconds or more (the fire did not self-distinguish in 600 seconds).
(2) Sharpness
Haze Using a direct-reading haze meter produced by Toyo Seiki Seisaku-sho, Ltd., the haze value was measured by placing only the transparent resin layer of each decorative sheet in the device. Decorative sheets having a haze value of 90.0 or less are evaluated as acceptable in actual use.
Appearance The appearance of the decorative sheet was visually observed from the transparent resin layer side (surface-protecting layer side) of the decorative sheet, and evaluated according to the following evaluation criteria. Decorative sheets evaluated as + or higher are evaluated as acceptable in actual use.
++: The pattern design of the picture pattern layer is clearly visible.
+: The pattern design of the picture pattern layer appears slightly cloudy.
−: The pattern design of the picture pattern layer appears discolored or cloudy.
Table 1 shows the results.

TABLE 1

| | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Flame retardant | Aluminum phosphinate Pekoflam STC | Aluminum phosphinate Pekoflam STC | Aluminum phosphinate Pekoflam STC | Aluminum phosphinate Pekoflam STC | Aluminum phosphinate Pekoflam STC | Zinc phosphinate Exolit OP950 | Aluminum phosphinate Exolit OP945 | Phosphoric acid-condensed ester PX200 | Ammonium polyphosphate FCP790 |
| Flame retardant in the transparent resin layer (parts by mass) | 10 | 5 | 30 | — | 5 | 10 | 10 | 15 | 30 |
| Flame retardant in the base material sheet (parts by mass) | — | — | — | 30 | 5 | — | — | — | — |

TABLE 1-continued

|  |  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|
| Flame retardant in the total mass of the thermoplastic resin layers (mass %) | | 5.7 | 3.0 | 14.4 | 14.4 | 8.0 | 5.7 | 5.7 | 8.2 | 14.4 |
| Horizontal burning | Fire spread distance | 0 cm ++ | 3.3 cm ++ | 0 cm ++ | 0.3 cm ++ | 0.3 cm ++ | 2.3 cm ++ | 0.6 cm ++ | 19.5 cm — | 0 cm ++ |
|  | Burning duration | 89 seconds | 252 seconds | 5 seconds | 100 seconds | 90 seconds | 232 seconds | 88 seconds | 600 seconds or more | No ignition |
| Sharpness | Transparent resin layer haze value | +++ 34.4 | ++ 25.8 | ++ 55.5 | ++ 7.5 | +++ 25.8 | ++ 31.2 | +++ 22.4 | — 95.2 | +++ 96.1 |
|  | Appearance | + | + | + | ++ | + | + | + | — | — |

Example 8

A decorative sheet was produced in the same manner as in Example 1 except that a transparent resin layer (thickness: 80 μm) and a base material sheet (thickness: 60 μm) contained a metal phosphinate-based flame retardant and a NOR-type hindered amine compound, and the compositions of the transparent resin layer and the base material sheet were as follows.
Transparent Resin Layer
  Polypropylene resin: 88.5 mass %
  Metal phosphinate-based flame retardant (product name: Pekoflam STC (produced by Archroma); aluminum phosphinate): 8.8 mass %
  NOR-type hindered amine (product name: Flamestab NOR 116 FF (produced by BASF A.G.)): 2.7 mass %
Base Material Sheet
  Polypropylene resin: 79.5 mass %
  Metal phosphinate-based flame retardant (product name: Pekoflam STC (produced by Archroma); aluminum phosphinate): 19.0 mass %
  NOR-type hindered amine (product name: Flamestab NOR 116 FF (produced by BASF A.G.)): 1.5 mass %
Production of Decorative Plate A decorative plate was produced in the same manner as in Example 1 except that the surface of the base material sheet side of the decorative sheet was bonded to the surface of an aluminum plate having a thickness of 0.8 mm via a two-component-curable urethane-based adhesive, and the two-component-curable urethane-based adhesive was applied in an amount of 2 g/m².

The two-component-curable urethane adhesive had the following composition.
Two-Component-Curable Urethane-Based Adhesive
  Adhesive: Aron Melt PES-320SK: 100 parts by mass
  Curing agent: Coronate: 5 parts by mass Example 9

A decorative sheet and a decorative plate were produced in the same manner as in Example 8 except that a transparent resin layer (thickness: 80 μm) and a base material sheet (thickness: 60 μm) contained a metal phosphinate-based flame retardant, and the compositions of the transparent resin layer and the base material sheet were as follows.
Transparent Resin Layer
  Polypropylene resin: 91.2 mass %
  Metal phosphinate-based flame retardant (product name: Pekoflam STC (produced by Archroma); aluminum phosphinate): 8.8 mass %
Base Material Sheet
  Polypropylene resin: 81.0 mass %
  Metal phosphinate-based flame retardant (product name: Pekoflam STC (produced by Archroma); aluminum phosphinate): 19.0 mass %

Comparative Example 3

A decorative sheet and a decorative plate were produced in the same manner as in Example 8, except that the transparent resin layer (thickness: 60 μm) and the base material sheet (thickness: 60 μm) contained neither a flame retardant nor a NOR-type hindered amine compound.

Comparative Example 4

A decorative sheet and a decorative plate were produced in the same manner as in Example 8, except that the transparent resin layer (thickness: 80 μm) and the base material sheet (thickness: 60 μm) contained neither a flame retardant nor a NOR-type hindered amine compound.

Reference Example 1

A transparent polypropylene resin containing the NOR-type hindered amine compound shown below was thermally melted and extruded using a T-die extruder to form a thermoplastic single-layer transparent resin layer (thickness: 80 μm).
  Polypropylene resin: 97.1 mass %
  NOR-type hindered amine (product name: Flamestab NOR 116 FF, produced by BASF A.G.): 2.9 mass %
Using the single-layer transparent resin layer, a decorative plate was produced in the same manner as in Example 8.

Reference Example 2

A transparent polypropylene resin containing the flame retardant shown below was thermally melted and extruded using a T-die extruder to form a thermoplastic single-layer transparent resin layer (thickness: 80 μm).
  Polypropylene resin: 71.4 mass %
  Ammonium polyphosphate (flame retardant) (product name: FCP790 (produced by Suzuhiro Chemical Co., Ltd.)): 28.6 mass %
Using the single-layer transparent resin layer, a decorative plate was produced in the same manner as in Example 8.
Evaluation The decorative plates thus obtained in Examples 8 and 9, Comparative Examples 3 and 4, and Reference Examples 1 and 2 were evaluated by the following methods.
(3) Heat Release Test A burning test was conducted under the conditions of a burning time of 3 minutes using a cone calorimeter by a measurement method in accordance with ISO 5660-1. The total heat release and the maximum heat release rate were measured. Decorative plates evaluated as ++ or higher in the total heat release or in the maximum heat release rate are evaluated as acceptable in practical use.
Total Heat Release
  +++: Less than 5.20 MJ/m$^2$
  ++: 5.20 MJ/m$^2$ or more and less than 5.38 MJ/m$^2$
  +: 5.38 MJ/m$^2$ or more and less than 5.55 MJ/m$^2$
  −: 5.55 MJ/m$^2$ or more
Maximum Heat Release Rate
  ++: Less than 133.93 KW/m$^2$
  ++: 133.93 KW/m$^2$ or more and less than 153.92 KW/m$^2$
  +: 153.92 KW/m$^2$ or more and less than 173.93 KW/m$^2$
  −: 173.93 KW/m$^2$ or more
Table 2 shows the results.

Comparative Example 5

A decorative sheet and a decorative plate were produced in the same manner as in Example 1, except that no flame retardant was added to the thermoplastic resin, and no surface-protecting layer was formed.

Comparative Example 6

A decorative sheet and a decorative plate were produced in the same manner as in Example 2, except that no flame retardant was added to the thermoplastic resin.
Evaluation The fire spread rate of each of the decorative plates obtained in Examples 2 and 10 and Comparative Examples

TABLE 2

|  | Example 8 | Example 9 | Comparative Example 3 | Comparative Example 4 | Reference Example 1 | Reference Example 2 |
|---|---|---|---|---|---|---|
| Flame retardant | Aluminum phosphinate Pekoflam STC | Aluminum phosphinate Pekoflam STC | — | — | — | Ammonium polyphosphate FCP790 |
| NOR-type hindered amine compound | Flamestab NOR 116FF | — | — | — | Flamestab NOR 116FF | — |
| Flame retardant in the transparent resin layer (mass %) | 8.8 | 8.8 | — | — | — | 28.6 |
| NOR-type hindered amine compound in the transparent resin layer (mass %) | 2.7 | — | — | — | 2.9 | — |
| Thickness of the transparent resin layer (μm) | 80 | 80 | 60 | 80 | 80 (Single layer) | 80 (Single layer) |
| Flame retardant in the base material sheet (mass %) | 19.0 | 19.0 | — | — | No base material sheet | No base material sheet |
| NOR-type hindered amine compound in the base material sheet (mass %) | 1.5 | — | — | — | | |
| Thickness of the base material sheet (μm) | 60 | 60 | 60 | 60 | | |
| Total heat release (MJ/m$^2$) | 5.15 +++ | 524 ++ | 538 + | 5.57 — | 2.17 | 238 |
| Maximum heat release rate (KW/m$^2$) | 112.11 +++ | 104.60 +++ | 153.93 + | 183.68 — | 75.06 | 97.61 |

Example 10

A decorative sheet and decorative plate were produced in the same manner as in Example 2, except that 5 parts by mass of a metal phosphinate-based flame retardant (product name; Pekoflam STC (produced by Archroma); aluminum phosphate) was added per 100 parts by mass of the electron beam-curable resin in the electron beam-curable resin composition.

Example 11

A decorative sheet and a decorative plate were produced in the same manner as in Example 1, except that no surface-protecting layer was formed.

5 and 6 was evaluated and compared in the following manner. Similarly, the fire spread rate of each of the decorative plates obtained in of Example 1 and 11 and Comparative Example 5 was also evaluated and compared in the following manner.

Figure 12:
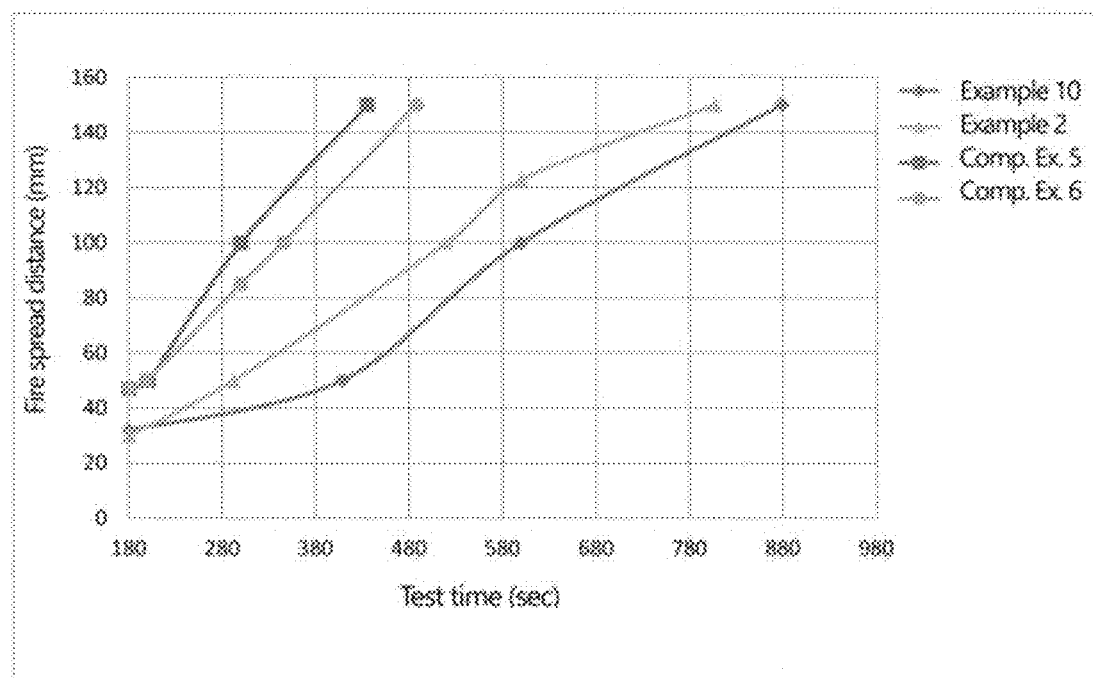
FIG. 12 is a graph showing the results of evaluating the fire spread rate.
Figure 13:
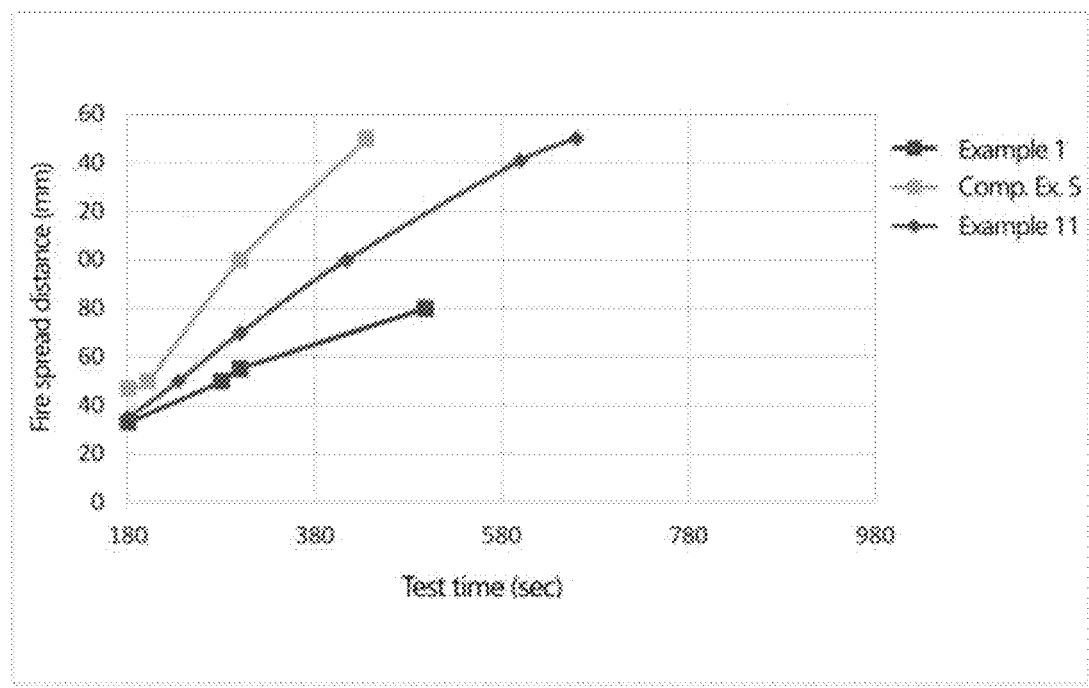
FIG. 13 is a graph showing the results of evaluating the fire spread rate.

The "flame spread distance (L1)" was measured by the method described above in section "(1) Horizontal Burning (Flame Retardance: Resistance to Fire Spread)." The measurement was performed as in FIGS. 10 and 11, except that the angle of the heater was changed to 20° so as to make a strong heating condition such as to allow the fire to easily spread. A test piece was ignited with a lighter; the burning duration from the initial ignition, excluding the flame of the lighter, was used as a test time; and the fire spread distance during the test time was measured and plotted for comparison. FIGS. 12 and 13 show the results.

DESCRIPTION OF REFERENCE NUMERALS

1. Decorative sheet
11. Synthetic-resin backer layer
12. Base material sheet
13. Picture pattern layer
14. Transparent resin layer
15. Surface-protecting layer
16. Fine particles
2. Base material
21. Wooden plate
22. Surface material
101. Household heater
102. Stand of household heater
103. Rectangular metal strand
104. Metal frame
105. Test Piece
106. End on the heater side in the longitudinal direction of the test piece
107. Lighter
L1. Fire spread distance

The invention claimed is:

1. A decorative sheet comprising a transparent resin layer, and a base material sheet, and optionally further comprising a synthetic-resin backer layer, and the transparent resin layer, the base material sheet, and the synthetic-resin backer layer being thermoplastic resin layers, wherein
   (1) at least one of the thermoplastic resin layers contains a metal phosphinate-based flame retardant, wherein the metal phosphinate-based flame retardant comprises metal phosphinates and/or dimetal phosphinates,
the metal phosphinates comprising compounds represented by the following formula (1);

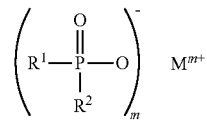

the dimetal phosphinates comprising compounds represented by the following formula (2):

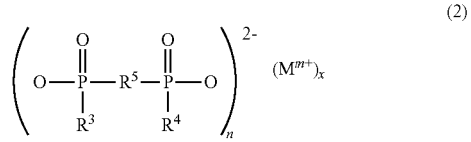

wherein in formulas (1) and (2), $R^1$, $R^2$, $R^3$, and $R^4$ are each independently selected from the group consisting of $C_1$-$C_6$ alkyl groups, $C_6$-$C_{12}$ aryl groups, and $C_7$-$C_{20}$ arylalkyl groups, $R^5$ is selected from the group consisting of $C_1$-$C_{10}$ alkylene groups, $C_6$-$C_{10}$ arylene groups, $C_7$-$C_{20}$ alkylarylene groups, and $C_7$-$C_{20}$ arylalkylene groups, M is at least one metal selected from the group consisting of magnesium and aluminum; m is 2 or 3; n is 1 or 3; and x is 1 or 2;
   (2) the transparent resin layer contains 5 parts by mass or more and 30 parts by mass or less of the metal phosphinate-based flame retardant, based on the amount of at least one member selected from the group consisting of polyolefin-based resins and polyester-based resins in the transparent resin layer being defined as 100 parts by mass, the base material sheet contain at least one resin selected from the group consisting of polyolefin-based resins and polyester-based resins; and
   (3) the synthetic-resin backer layer contains at least one resin selected from the group consisting of polypropylene, ethylene-vinyl alcohol copolymers, polymethylene, polymethyl pentene, polyethylene terephthalate, highly heat-resistant polyalkylene terephthalate, polybutylene terephthalate, polyethylene naphthalate, polyethylene naphthalate-isophthalate copolymers, polycarbonate, polyarylate, polyimide, polystyrene, polyamide, and ABS, and the synthetic-resin backer layer optionally contains the metal phosphinate-based flame retardant.

2. The decorative sheet according to claim 1, wherein the content of the metal phosphinate-based flame retardant in the transparent resin layer is 14 mass % or more, based on the total mass of the thermoplastic resin layers being defined as 100 mass %.

3. The decorative sheet according to claim 1, wherein at least one of the thermoplastic resin layers contains a NOR-type hindered amine compound.

4. The decorative sheet according to claim 1, wherein at least one of the thermoplastic resin layers contains the metal phosphinate-based flame retardant and a filler.

5. The decorative sheet according to claim 4, wherein the filler is an inorganic filler having a polar group on the surface.

6. The decorative sheet according to claim 1, comprising at least a picture pattern layer and the transparent resin layer formed on the base material sheet in this order.

7. The decorative sheet according to claim 1, comprising a surface-protecting layer on the outermost surface.

8. The decorative sheet according to claim 1, comprising at least a picture pattern layer, the transparent resin layer, and a surface-protecting layer formed on the base material sheet in this order.

9. The decorative sheet according to claim 7, wherein the surface-protecting layer is an ionizing radiation-curable resin layer.

10. The decorative sheet according to claim 7, wherein the surface-protecting layer contains the metal phosphinate-based flame retardant.

11. The decorative sheet according to claim 6, having an embossed shape on the transparent resin layer side.

12. A decorative plate comprising the decorative sheet of claim 1 formed on a base material.

13. The decorative sheet according to claim 2, comprising at least a picture pattern layer and the transparent resin layer formed on the base material sheet in this order.

14. The decorative sheet according to claim 2, comprising a surface-protecting layer on the outermost surface.

15. The decorative sheet according to claim 2, comprising at least a picture pattern layer, the transparent resin layer, and a surface-protecting layer formed on the base material sheet in this order.

16. The decorative sheet according to claim 8, wherein the surface-protecting layer is an ionizing radiation-curable resin layer.

17. The decorative sheet according to claim 8, wherein the surface-protecting layer contains the metal phosphinate-based flame retardant.

18. The decorative sheet according to claim 8, having an embossed shape on the transparent resin layer side.

19. A decorative plate comprising the decorative sheet of claim 2 formed on a base material.

* * * * *